United States Patent
Asnaashari

(10) Patent No.: US 12,499,244 B1
(45) Date of Patent: Dec. 16, 2025

(54) PARAMETERIZED KEY SIZE FOR CSP ADDRESS TABLE MAPPING IN SECURE MICROCONTROLLER WITH UNIFIED RRAM

(71) Applicant: Crossbar, Inc., Santa Clara, CA (US)

(72) Inventor: Mehdi Asnaashari, Danville, CA (US)

(73) Assignee: Crossbar, Inc., Santa Clara, CA (US)

( * ) Notice: Subject to any disclaimer, the term of this patent is extended or adjusted under 35 U.S.C. 154(b) by 221 days.

(21) Appl. No.: 18/218,955

(22) Filed: Jul. 6, 2023

(51) Int. Cl.
*G06F 21/60* (2013.01)

(52) U.S. Cl.
CPC .................................. *G06F 21/602* (2013.01)

(58) Field of Classification Search
CPC ...................................................... G06F 21/602
See application file for complete search history.

(56) References Cited

U.S. PATENT DOCUMENTS

| | | | |
|---|---|---|---|
| 10,868,679 B1 * | 12/2020 | Van Antwerpen | G06F 3/0622 |
| 2016/0099810 A1 * | 4/2016 | Li | H04L 9/3242 |
| | | | 713/193 |
| 2016/0335201 A1 * | 11/2016 | Lea | G06F 21/71 |

* cited by examiner

*Primary Examiner* — Sangseok Park
(74) *Attorney, Agent, or Firm* — Wegman Hessler Valore

(57) ABSTRACT

A secure microcontroller for a secure data storage device can utilize two-terminal non-volatile memory for enhanced security and component density. The secure microcontroller can operate portions of the two-terminal memory in different modes, such as OTP, rewritable or MTP, physical unclonable function PUF and so forth, and discriminate among data access requests according to data characterizations defined for data parameters stored at the secure storage device. A link table maintained by the secure microcontroller can correlate these characterizations with distinct data parameters. In some embodiments of the present disclosure, the secure microcontroller can also maintain predefined characterizations that are common to many data sets. In these embodiments, the link table can simply correlate many of the data sets to one of the predefined characterizations and significantly reduce the overhead involved in characterizing many distinct data parameters.

20 Claims, 16 Drawing Sheets

EXAMPLE CONFIGURATION PER SLOT TYPE
500

| DEFINITION 510 | # OF BITS 520 | DESCRIPTION 530 |
|---|---|---|
| ACCESS TYPE 512 | 4 | XXX0 = Not accessible by SE, XXX1 = Accessible by SE<br>XX0X = Not accessible by CE, XX1X = Accessible by SCE<br>X0XX = Not accessible by User, X1XX = Accessible by User<br>0XXX = Not accessible by M7, 1XXX = Accessible by M7 |
| CRYPTO TYPE 513 | 2 | 00 = HMAC Key<br>01 = AES Key<br>10 = ECC Key |
| READ REQUIRES AUTH. 514 | 1 | Before this slot can be Read, prior mac authentication is required. |
| READ AUTH. SLOT 515 | 4 | Authentication slot for Read |
| COUNT0_Controlled 516 | 1 | Use of this slot is controlled by Counter0 |
| WRITE REQUIRES AUTH. 517 | 1 | Before this slot can be Written, prior mac authentication is required. |
| WRITE AUTH. SLOT 518 | 4 | Authentication slot for Write |
| WRITE Configuration 519 | 1 | 0 = Slot is Writable, 1 = Slot is not Writable |

FIG. 5

EXAMPLE SLOT CONFIGURATION AND ACCESS CONTROL
600

| SLOT IDs 410 | W E 621 | W Auth Slot 622 | W Auth 623 | CNT_0 624 | R Auth Slot 625 | R Auth 626 | Crypto Type 627 | Access Type 628 |
|---|---|---|---|---|---|---|---|---|
| SLOT 1 | $P_1$ | | | | | | | |
| SLOT 2 | $P_2$ | | | | | | | |
| SLOT 3 | $P_3$ | | | | | | | |
| ... | ... | ... | ... | ... | ... | ... | ... | ... |
| SLOT n | $P_n$ | | | | | | | |

PARAMETER BITS 420

CONFIGURATION BITS 620

FIG. 6

EXAMPLE PREDEFINED CONFIGURATION DEFINITIONS
700
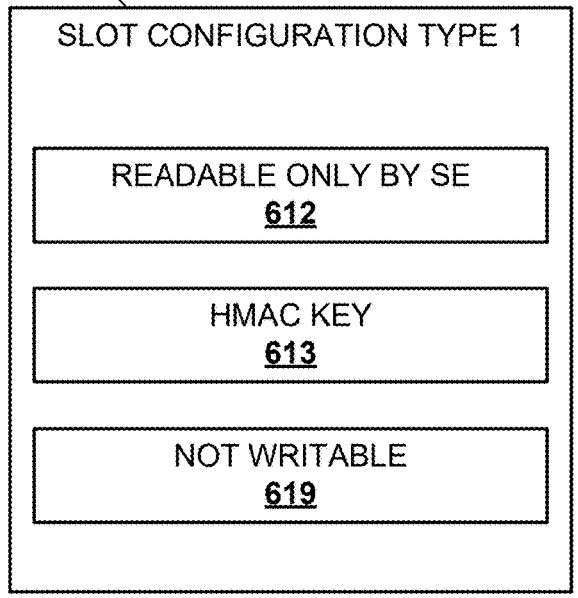
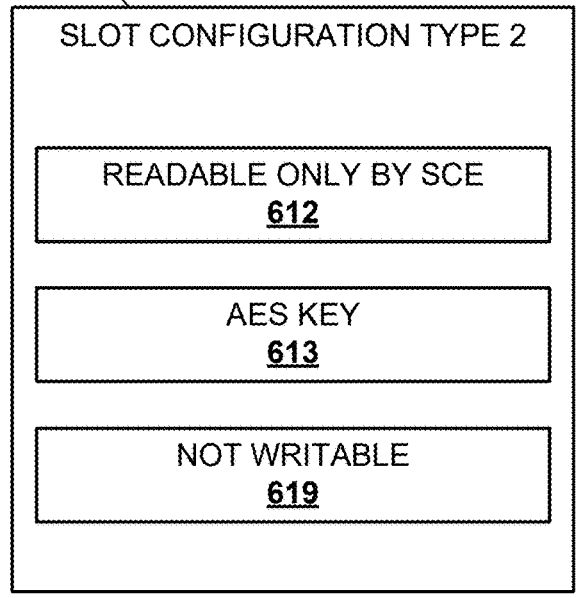
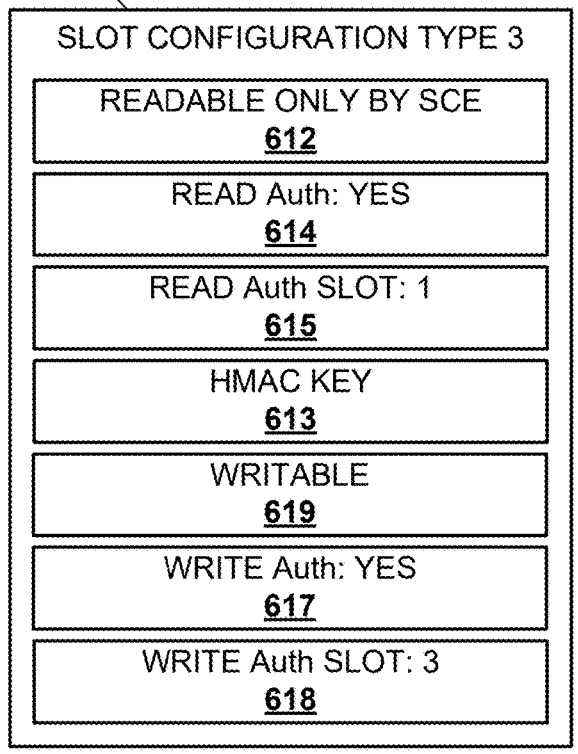
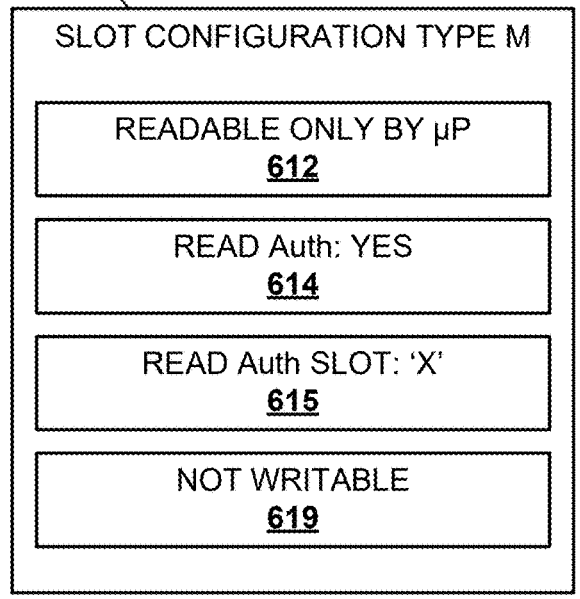
FIG. 7

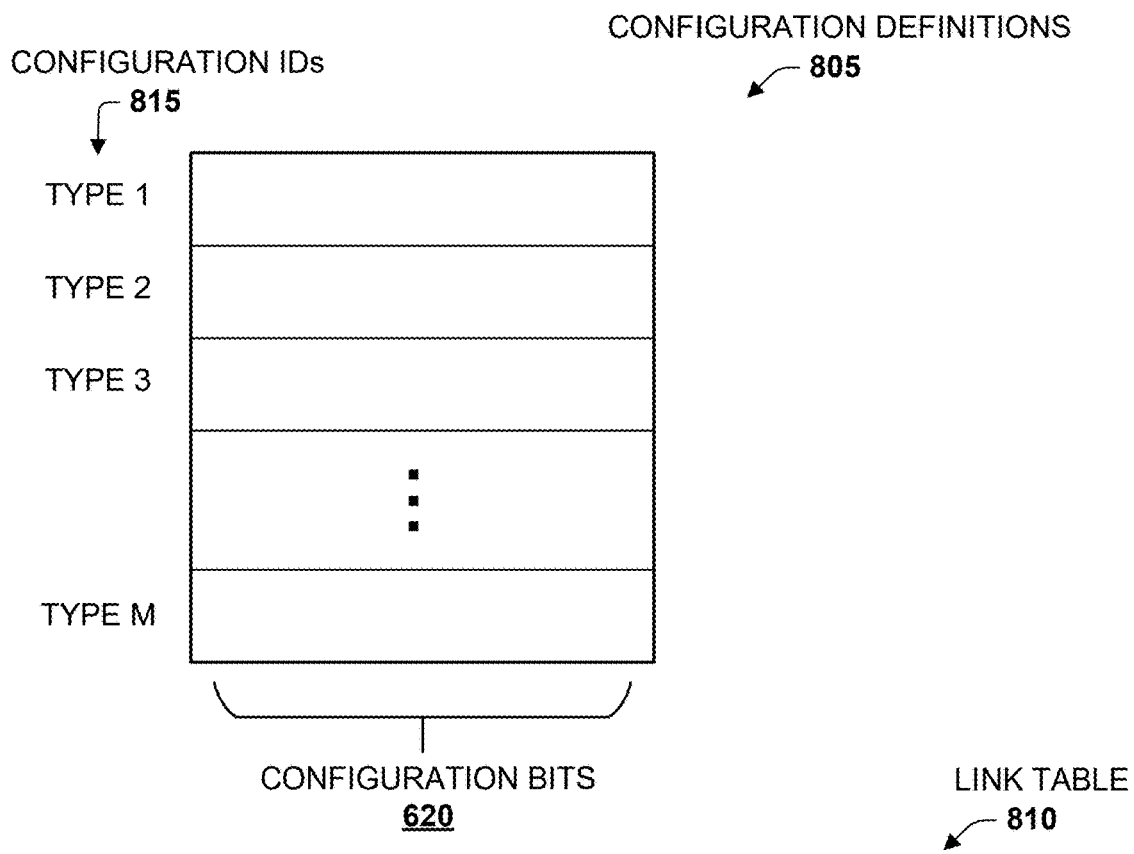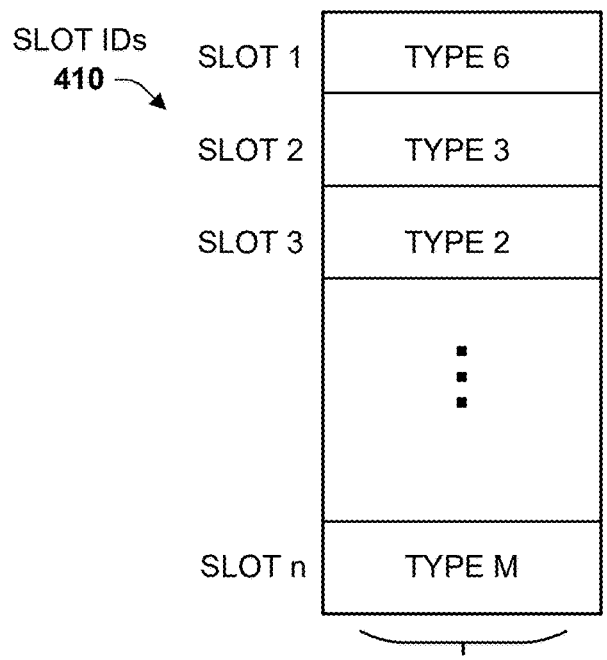
FIG. 8

EXAMPLE CSP MEMORY ADDRESS TABLE 1300

CSP AND SIZE TABLE 1305

| SLOT IDs 410 | PARAMETER 1 | P₁ SIZE |
|---|---|---|
| SLOT 1 | PARAMETER 1 | P₁ SIZE |
| SLOT 2 | PARAMETER 2 | P₂ SIZE |
| SLOT 3 | PARAMETER 3 | P₃ SIZE |
| ... | ... | ... |
| SLOT N | PARAMETER N | P_N SIZE |
|  | PARAMETER BITS 420 | CSP SIZE BITS 1020 |

ReRAM MEMORY TABLE 1338

| PARAMETER IDs 1310 | START ADD. 1312 | LENGTH 1314 |
|---|---|---|
| P₁ ADDRESS | 0 | P₁ SIZE |
| P₂ ADDRESS | P₁ SIZE | P₂ SIZE |
| P₃ ADDRESS | P₁₊₂ SIZE | P₃ SIZE |
| ... | ... | ... |
| P_N ADDRESS | P_(N-1)! SIZE | P_N SIZE |
|  | ReRAM ADDRESS LOCATIONS 1320 | |

FIG. 13

PARAMETERIZED KEY SIZE FOR CSP ADDRESS TABLE MAPPING IN SECURE MICROCONTROLLER WITH UNIFIED RRAM

INCORPORATION BY REFERENCE

U.S. patent application Ser. No. 17/223,817 filed Apr. 6, 2021 and titled "DISTINCT CHIP IDENTIFIER SEQUENCE UTILIZING UNCLONABLE CHARACTERISTICS OF RESISTIVE MEMORY ON A CHIP", is hereby incorporated by reference herein in its entirety and for all purposes.

TECHNICAL FIELD

The subject disclosure relates generally to secure electronic devices, and as one illustrative example, a memory controller with unified resistive memory and sub-module addressing and access control for a secure storage device.

BACKGROUND

Resistive-switching memory represents a recent innovation within the field of integrated circuit technology. While much of resistive-switching memory technology is in the development stage, various technological concepts for resistive-switching memory have been demonstrated and are in one or more stages of verification to prove or disprove associated theories or techniques. Resistive-switching memory technology is expected to show compelling evidence of substantial advantages over competing technologies in the semiconductor electronics industry in the near future.

Proposals for practical utilization of resistive-switching technology to memory applications for electronic devices have been put forth. For instance, resistive-switching elements are often theorized as viable alternatives, at least in part, to metal-oxide semiconductor (MOS) type memory transistors employed for electronic storage of digital information. Models of resistive-switching memory devices provide some potential technical advantages over non-volatile FLASH MOS type transistors, for instance.

In addition to memory elements, volatile resistive-switching elements have been proposed in conjunction with a MOS transistor for a high-speed non-volatile memory device, or as a high-speed field actuated switch, or selector device. Still further, stochastic characteristics of resistive-switching structures have been proposed by the inventor as suitable for generating non-correlated data for random number generation, or similar applications. Each of these applications has met different needs for electronic memory applications or specialty data generation applications.

In light of the above, the Assignee of the present disclosure continues to develop and pursue practical utilizations of resistive-switching technology.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Aspects of the present disclosure provide for a secure microcontroller for a secure data storage device that utilizes two-terminal non-volatile memory. The secure microcontroller can operate portions of the two-terminal memory in different modes, such as one-time programmable (OTP), rewritable or many-time programmable (MTP), physical unclonable function (PUF) and so forth, and discriminate among data access requests that leverage different modes of memory. As an example, the secure microcontroller can characterize respective data sets stored in the two-terminal memory and validate (or invalidate) an access request to a data set according to the characteristics defined for that data set. A link table that correlates these characterizations with distinct sets of stored data can be maintained by the secure microcontroller. In some embodiments of the present disclosure, the secure microcontroller can also maintain predefined characterizations that are common to many data sets. In these embodiments, the link table can simply correlate many of the data sets to one of the predefined characterizations. This can significantly reduce the overhead involved in characterizing many distinct data sets.

In aspects of the subject disclosure, provided is a secure element of a secure storage device. The secure element can comprise an array of two-terminal non-volatile memory that stores a parameter for a security application at a plurality of two-terminal memory cells of the array. In addition, the secure element can comprise an access control communicatively coupled to the array of two-terminal non-volatile memory. The access control can comprise an array control circuitry for management of memory operations at the array including a read memory operation targeting the parameter stored at the plurality of two-terminal memory cells. Further, the access control can comprise a configuration dataset that defines an access limitation for implementing the read memory operation targeting the parameter, wherein the access control stores the access limitation in association with the parameter. Still further, the access control can comprise array control logic for implementing the read memory operation for the parameter in response to the access limitation being met and denying the read memory operation in response to the access limitation not being met. In addition to the foregoing, the secure element can comprise a communication interface configured to receive data communication that defines the read memory operation to the security parameter and provides the data communication to the access control.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

FIG. 5 illustrates a table of data characterization definitions for stored data parameters according to disclosed embodiments;

FIG. 6 depicts an example configuration and access link table to correlate data characterizations with stored data parameters, in further embodiments;

FIG. 7 illustrates an example of predefined characterizations to reduce memory overhead for the configuration and access link table of FIG. 6;

FIG. 8 depicts an example configuration and link table utilizing predefined characterizations according to further embodiments of the present disclosure;

FIG. 13 illustrates a block diagram of an example data mapping table for intrinsic data mapping in still further embodiments;

DETAILED DESCRIPTION

Introduction

Figure 1:
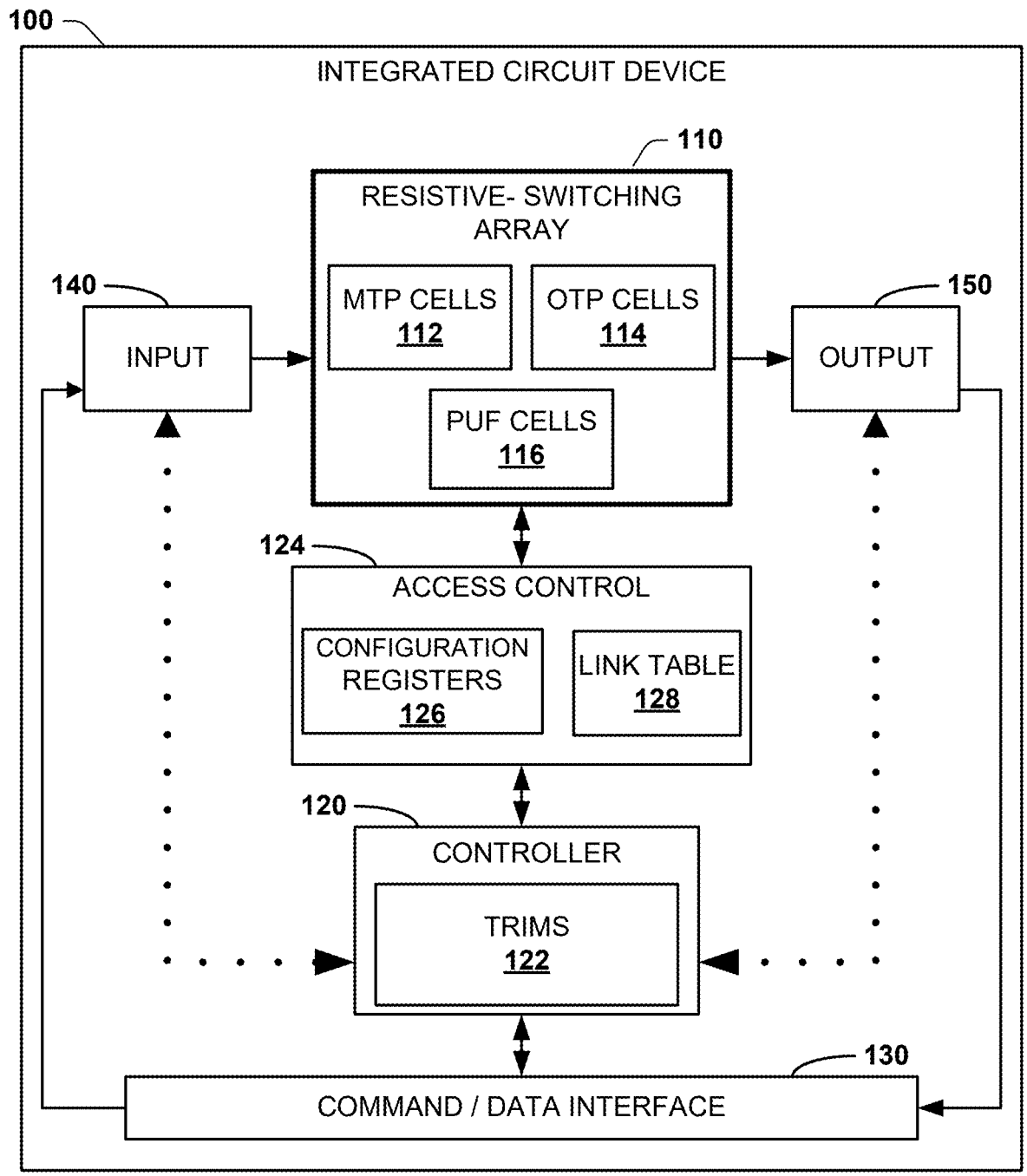
FIG. 1 illustrates a block diagram of an example integrated circuit device embodying a secure element of a secure storage device, in disclosed embodiments.

One or more embodiments of the present disclosure provide a secure microcontroller that can enhance flexibility as well as improve data integrity in secure data storage applications. In some embodiments, a two-terminal non-volatile memory array can be coupled with the secure microcontroller for storing security parameters associated with the secure data storage applications. The two-terminal non-volatile memory array can be selected to store or even generate the security parameters, in various embodiments. In further embodiments, the two-terminal non-volatile memory array can have portions thereof characterized for different storage types, such as physical unclonable function (PUF) data generation and storage, one-time programmable (OTP) data storage and many-time programmable (MTP) data storage. A secure microcontroller operating the memory array can discriminate among data requests as a function of stored characteristics of an application requesting data, of characteristics of the data requested, or even as a function of characteristics of the memory cells storing the data (e.g., whether such cells are characterized as MTP, OTP, PUF, or the like).

Providing different memory characterizations enables different access control processes for different process hardware, different applications and different types of stored data. For instance, security parameters such as cryptographic keys, hash function data, unique identifiers, passcodes, and so forth, can be stored or even generated in PUF bits of the two-terminal non-volatile memory array. Code data for operating electronic hardware or software can be stored in OTP memory cells or MTP memory cells, depending on attributes and usage of such code data. For instance, code data for basic operating characteristics of a disclosed memory controller or secure storage device intended to have little to no change in function can be stored in OTP memory cells (or even in PUF data if the code data pertains to security functions of the microcontroller or secure storage device). Similarly, firmware of a disclosed secure storage device or of a host device in communication with the secure storage device could be stored in OTP bits. In contrast, programmable code such as for a field programmable gate array (FPGA), an application specific integrated circuit (ASIC) or similar programmable circuit can be stored in MTP bits. Likewise, rewritable data utilized by any of the foregoing applications can also be stored in MTP bits.

Disclosed memory microcontrollers (e.g., a secure microcontroller) can be configured to operate with a unified, multi-characterized memory structure in approving or denying access to stored data. A disclosed access control module (whether circuitry, software, or both) can classify stored data utilizing configuration data. In some embodiments, configuration data can be stored in memory embedded within a secure microcontroller; in other embodiments, the configuration data can be stored in a two-terminal non-volatile memory array; in still other embodiments the configuration data can be stored in configuration registers or the like, or a suitable combination of the foregoing can be implemented with yet other embodiments of the present disclosure. The access control module can receive a data access request (e.g., a read request, a write request, a rewrite request, a PUF data generation/PUF write request, etc.) and can discriminate among process modules transmitting the request in determining whether to validate and implement the request. In some embodiments, access control can also discriminate among process sub-modules or applications operating on a given process module in determining whether to give access to specific data parameters. Data access requests for security parameters can require satisfying a first set of access control conditions whereas access requests for code data or rewritable application data can require satisfying one or more other access control conditions, managed by disclosed access control modules.

Additional embodiments of the present disclosure provide for maintenance of configuration data to classify different data parameters stored in non-volatile memory. The configuration data can include whether authorization is required to read a parameter, whether writing to the parameter or overwriting the parameter is permitted and whether write authorization is required, as well as what stored parameters read validation and write validation are authenticated against (e.g., see FIG. 5, infra). Examples of authorization techniques for read or write access can include a user password/PIN validation, a device validation such as verifying a media access control (MAC) address of a requesting device, or the like, or suitable combinations of the foregoing. In addition to the foregoing, configuration data can specify a process module identifier(s) authorized to access a parameter, and for security parameters can specify a sub-module identifier(s) matching a security type configuration of the parameter. To reduce memory overhead involved in maintaining configuration data for stored data parameters, predefined configuration types are disclosed having a fixed set of configurations and a label (e.g., see FIG. 7, infra). The label can be stored in the configuration data with respect to multiple stored data parameters (e.g., see FIG. 8, infra), to reduce the memory overhead involved in configuring each of the data parameters.

Aspects of the present disclosure can utilize a resistive switching memory array for non-volatile storage that is suitable for generating and storing PUF data embodying stored security parameters. Suitable resistive switching memory cells can generate highly random data by leveraging stochastic or substantially stochastic physical characteristics of nano-scale resistive switching devices. Such data will have little to no correlation among a population of bits thereof. As a result, that data can be suited to applications requiring distinct or unique identification, such as identification and authorization applications pertaining to a device, for security applications, such as random number generation, cryptography key generation, key or security code validation functions, and the like. Disclosed microcontrollers can be configured to characterize security data and code data to differentiate among access requests, requiring satisfaction of heightened security conditions for accessing stored security parameters and requiring fewer security conditions for accessing code data and fewer conditions still (or even no conditions beyond bus protocol compliance) for accessing rewritable data.

In further embodiments, disclosed two-terminal non-volatile memory structures (e.g., resistive switching memory, magnetic switching memory, phase change memory, among others) can be constructed among electromagnetically opaque metal lines of a semiconductor die (e.g., among backend-of-line wiring structures that are non-transparent to a fairly large portion of the electromagnetic imaging spectrum: visible light, UV light, infrared light, etc.). This architecture enhances the difficulty involved in illicit side-channel access techniques such as unauthorized device layer microscopy. In one or more additional embodiments, some disclosed sequence generation processes can be rendered permanent through one-time programmable processes, allowing a sequence to be reliably re-read over a very large number of read cycles to reliably and accurately reproduce a previously generated data sequence, achieving extremely low bit error rates. In still further embodiments, disclosed processes for generating non-correlated data sequences can involve processes compatible with resistive switching device operation, allowing a set of resistive switching devices to be selected post-fabrication from any suitable subset of resistive switching devices on a chip. Systems and methods are further provided to export control of resistive switching device selection, data sequence process selection and process configuration—associated with physically unclonable data sequence generation disclosed herein—to a user of the chip post-fabrication (e.g., by way of command/data interface 130 of FIG. 1, infra). Various other embodiments will be readily apparent based on the disclosure herein and the associated drawings.

As utilized herein, the term "substantially" and other relative terms or terms of degree (e.g., about, approximately, substantially, and so forth) are intended to have the meaning specified explicitly in conjunction with their use herein, or a meaning which can be reasonably inferred by one of ordinary skill in the art, or a reasonable variation of a specified quality(ies) or quantity(ies) that would be understood by one of ordinary skill in the art by reference to this entire specification (including the knowledge of one of ordinary skill in the art as well as material incorporated by reference herein). As an example, a term of degree could refer to reasonable manufacturing tolerances about which a specified quality or quantity could be realized with fabrication equipment. Thus, as a specific illustration, though non-limiting, for an element of a resistive switching device expressly identified as having a dimension of about 50 angstroms (A), the relative term "about" can mean reasonable variances about 50 A that one of ordinary skill in the art would anticipate the specified dimension of the element could be realized with commercial fabrication equipment, industrial fabrication equipment, laboratory fabrication equipment, or the like, and is not limited to a mathematically precise quantity (or quality). In other examples, a term of degree could mean a variance of +/−0-3%, +/−0-5%, or +/−0-10% of an expressly written value, where suitable to one of ordinary skill in the art to achieve a stated function or feature of an element disclosed herein. In still other examples, a term of degree could mean any suitable variance in quality(ies) or quantity(ies) that would be suitable to accomplish an explicitly disclosed function(s) or feature(s) of a disclosed element. Accordingly, the subject specification is by no means limited only to specific qualities and quantities disclosed herein, but includes all variations of a specified quality(ies) or quantity(ies) reasonably conveyed to one of ordinary skill in the art by way of the context provided by the subject disclosure.

Embodiments of the present disclosure leverage stochastic or substantially stochastic physical characteristics of nano-scale resistive switching devices to generate data. Being generally random, stochastic features of resistive switching devices can be leveraged to produce data that has little to no correlation among a population of such devices. As a result, that data can be suited to applications requiring distinct or unique identification, such as security applications, cryptographic applications such as generating cryptographic keys, validating cryptographic keys, performing hash functions, generating true random numbers, other data/identity validation, and so forth.

Some disclosed embodiments propose aggregation of multiple memory cells to define a single bit: also called an identifier bit, a differential bit, a PUF bit, and the like. Program processes to generate data for a PUF bit defined by multiple cells are referred to generally as differential program processes. In some embodiments, differential programming can include detection of a program event(s) for one (or a group) of the memory cells and disconnection of the multiple cells from supply voltage. Other aspects include intrinsic suppression of non-programmed memory cells in response to a program event for one (or a group) of the memory cells. These aspects can mitigate or avoid invalid data results for differential programming, as well as reduce power consumption.

Data produced by a PUF data generation process can be utilized as PUF data, but also as Root of Trust data or other secure validation data. In terms of resistive switching memory the PUF data generation process can typically involve a resistive switching cell process applied to one or more resistive switching cells that define a PUF bit(s) (e.g., see U.S. Pat. No. 11,430,516 commonly owned by the current Assignee and incorporated by reference as U.S. application Ser. No. 17/223,817, hereinabove). Such a process can involve native resistive switching memory cells (sometimes referred to as virgin resistive switching memory cells) that have not been previously changed from an as-fabricated high resistance state (e.g., see below). Example memory processes can include a forming process (e.g., comprising one or more electrical forming pulses), a program process (e.g., comprising one or more electrical program pulses), an erase process (e.g., comprising one or more electrical erase pulses), an overwrite process, and so forth. In addition, PUF data generated from non-volatile resistive switching memory cells can thereafter be stored and read from at least a subset of the non-volatile resistive switching memory cells utilized to generate the PUF data. In at least some disclosed embodiments, a PUF generation process can be rendered permanent through a one-time programmable process(es) applied to a bit that becomes programmed in response to the PUF generation process, and that defines a PUF bit or a portion of a PUF bit.

As utilized herein, the term "native", "original", "virgin" or the like can refer to post-fabrication but pre-commercial operation of resistive switching devices on a semiconductor die. Native (and like terminology) need not exclude some or all post-fabrication operations such as quality testing or other verification routines performed by a manufacturer, and even some pre-commercial operation by a non-manufacturer such as testing to ensure manufacturer quality specifications are met by a chip, chip setup routines or configuration routines (e.g., defining one-time programmable memory or identifier memory within an array of resistive switching memory; see e.g., FIG. 1, infra), among others. In general, a resistive switching device is in a native state, as utilized herein, if it has not yet received a stimulus (e.g., electrical, thermal, magnetic, or a like stimulus known in the art, suitable combinations thereof, and so forth) suitable to form a conductive filament within the resistive switching device and change the resistive switching device from an electrically resistive state to an electrically conductive state as described herein or known in the art.

As the name implies, a two-terminal resistive switching device has two terminals or electrodes. Herein, the terms "electrode" and "terminal" are used interchangeably. Generally, a first electrode of a two-terminal resistive switching device is referred to as a "top electrode" (TE) and a second electrode of the two-terminal resistive switching device is referred to as a "bottom electrode" (BE), although it is understood that electrodes of two-terminal resistive switching devices can be according to any suitable arrangement, including a horizontal arrangement in which components of a memory cell are (substantially) side-by-side rather than overlying one another. Between the TE and BE of a two-terminal resistive switching device is typically an interface layer sometimes referred to as a switching layer, a resistive switching medium (RSM) or a resistive switching layer (RSL). It should be understood however that such devices are not limited to these layers as one or more barrier layer(s), adhesion layer(s), ion conduction layer(s), seed layer(s), particle source layer(s), or the like can be included between or adjacent one or more of the TE, the BE or the interface layer where suitable. More generally, a disclosed embodiment can include additional devices, circuitry or architectures disclosed herein, disclosed within a publication incorporated by reference herein, generally understood and utilized in the art, or reasonably conveyed to one of ordinary skill in the art by way of the context provided herein.

Composition of memory cells, generally speaking, can vary per device with different components, materials or deposition processes selected to achieve desired characteristics. One example resistive switching device is a filamentary-based resistive switching device. Such a device can comprise: a conductive layer (e.g., a metal, metal-alloy, metal-nitride such as: TiN, TaN, TiW, or the like, or other suitable metal compounds), an optional interface layer (e.g., doped p-type (or n-type) silicon (Si) bearing layer such as: a p-type or n-type Si bearing layer, p-type or n-type polysilicon, p-type or n-type polycrystalline SiGe, etc.), a resistive switching layer (RSL) that is electrically resistive and an active metal-containing layer capable of being ionized. Under suitable conditions, the active metal-containing layer can provide filament-forming ions to the RSL. In such embodiments, a conductive filament (e.g., formed by the ions) can facilitate electrical conductivity through at least a subset of the RSL, and a resistance of the filament-based device can be determined, as one example, by a tunneling resistance between the filament and the conductive layer. A memory cell having such characteristics may be described as a filamentary-based device.

For disclosed resistive switching filamentary-based devices, completion of a conductive filament can involve only a few particles (e.g., atoms, ions, conductive compounds, etc.) of conductive material, or less. As one particular example, an electrically continuous conductive filament could be established by position of 1-3 atoms at a boundary of a switching layer, whereas repositioning of one or more of these atoms can break that electrical continuity, in some embodiments. Because the scale is so small between a completed filament and non-completed filament, illicit side-channel attempts to read bits of memory—for example through high intensity microscopy—can be very difficult, if not impossible due to the difficulty of imaging such small particles and determining whether their location is sufficient to establish electrical continuity. Still further, disclosed resistive switching devices can be formed among metal lines of a semiconductor chip. The density of metal wiring layers further occludes visibility of the resistive switching devices, making common side-channel techniques unprofitable.

Referring again to composition of a filamentary resistive switching device, a RSL (which can also be referred to in the art as a resistive switching media (RSM)) can comprise, e.g., an undoped amorphous Si-containing layer, a semiconductor layer having intrinsic characteristics, a stoichiometric or non-stoichiometric silicon nitride (e.g., SiN, $Si_3N_4$, $SiN_x$, etc.), a Si sub-oxide (e.g., $SiO_x$ wherein x has a value between 0.1 and 2), a Si sub-nitride, a metal oxide, a metal nitride, a non-stoichiometric silicon compound, and so forth. Other examples of materials suitable for the RSL could include $Si_xGe_yO_z$ (where x, y and z are respective suitable positive numbers), a silicon oxide (e.g., $SiO_N$, where N is a suitable positive number), a silicon oxynitride, an undoped amorphous Si (a-Si), amorphous SiGe (a-SiGe), $TaO_B$ (where B is a suitable positive number), $HfO_C$ (where C is a suitable positive number), $TiO_D$ (where D is a suitable number), $Al_2O_E$ (where E is a suitable positive number) and so forth, a nitride (e.g., AlN, SiN), or a suitable combination thereof.

In some embodiments, a RSL employed as part of a non-volatile memory device (non-volatile RSL) can include a relatively large number (e.g., compared to a volatile selector device) of material voids or defects to trap neutral metal particles (e.g., at low voltage) within the RSL. The large number of voids or defects can facilitate formation of a thick, stable structure of the neutral metal particles. In such a structure, these trapped particles can maintain the non-volatile memory device in a low resistance state in the absence of an external stimulus (e.g., electrical power), thereby achieving non-volatile operation.

An active metal-containing layer for a filamentary-based memory cell can include, among others: silver (Ag), gold (Au), titanium (Ti), titanium-nitride (TiN) or other suitable compounds of titanium, nickel (Ni), copper (Cu), aluminum (Al), chromium (Cr), tantalum (Ta), iron (Fe), manganese (Mn), tungsten (W), vanadium (V), cobalt (Co), platinum (Pt), hafnium (Hf), and palladium (Pd). Other suitable conductive materials, as well as stoichiometric or non-stoichiometric: compounds, nitrides, oxides, alloys, mixtures or combinations of the foregoing or similar materials can be employed for the active metal-containing layer in some aspects of the subject disclosure. Further, a non-stoichiometric compound, such as a non-stoichiometric metal oxide/metal-oxygen or metal nitride/metal nitrogen (e.g., $AlO_x$, $AlN_x$, $CuO_x$, $CuN_x$, $AgO_x$, $AgN_x$, and so forth, where x is a suitable positive number or range of numbers, such as: $0<x<2$, $0<x<3$, $0<x<4$ or other number/range of numbers depending on metal compound, which can have differing values for differing ones of the non-stoichiometric compounds) or other suitable metal compound can be employed for the active metal-containing layer, in at least one embodiment.

In one or more embodiments, a disclosed filamentary resistive switching device can include an active metal layer comprising a metal-nitrogen selected from the group consisting of: $TiN_x$, $TaN_x$, $AlN_x$, $CuN_x$, $WN_x$ and $AgN_x$, where x is a positive number (or range of numbers) that can vary per metal-nitrogen material. In a further embodiment(s), the active metal layer can comprise a metal-oxygen selected from the group consisting of: $TiO_x$, $TaO_x$, $AlO_x$, $CuO_x$, $WO_x$ and $AgO_x$ where x is a positive number (or range of numbers) that can likewise vary per metal-oxygen material. In yet another embodiment(s), the active metal layer can comprise a metal oxygen-nitrogen selected from the group consisting of: $TiO_aN_b$, $AlO_aN_b$, $CuO_aN_b$, $WO_aN_b$ and $AgO_aN_b$, where a and b are suitable positive numbers/ranges of numbers. The disclosed filamentary resistive switching device can further comprise a switching layer comprising a switching material selected from the group consisting of: $SiO_y$, $AlN_y$, $TiO_y$, $TaO_y$, $AlO_y$, $CuO_y$, $TiN_x$, $TiN_y$, $TaN_x$, $TaN_y$, $SiO_x$, $SiN_y$, $AlN_x$, $CuN_x$, $CuN_y$, $AgN_x$, $AgN_y$, $TiO_x$, $TaO_x$, $AlO_x$, $CuO_x$, $AgO_x$, and $AgO_y$, where x and y are positive numbers (or ranges), and y is larger than x. Various combinations of the above are envisioned and contemplated within the scope of embodiments of the present invention.

In one example, a disclosed filamentary resistive switching device comprises a particle donor layer (e.g., the active metal-containing layer) comprising a stoichiometric or non-stoichiometric metal compound (or mixture) and a resistive switching layer. In one alternative embodiment of this example, the particle donor layer comprises a metal-nitrogen: $MN_x$, e.g., $AgN_x$, $TiN_x$, $AlN_x$, etc., and the resistive switching layer comprises a metal-nitrogen: $MN_y$, e.g., $AgO_y$, $TiO_y$, $AlO_y$, and so forth, where y and x are positive numbers (or ranges), and in some cases y is larger than x. In an alternative embodiment of this example, the particle donor layer comprises a metal-oxygen: $MO_x$, e.g., $AgO_x$, $TiO_x$, $AlO_x$, and so on, and the resistive switching layer comprises a metal-oxygen: $MO_y$, e.g., $AgO_y$, $TiO_y$, $AlO_y$, or the like, where y and x are positive numbers (or ranges), and in some cases y is larger than x. In yet another alternative, the metal compound of the particle donor layer is a $MN_x$ (e.g., $AgN_x$, $TiN_x$, $AlN_x$, etc.), and the resistive switching layer is selected from a group consisting of $MO_y$ (e.g., $AgO_y$, $TiO_y$, $AlO_y$, etc.) and $SiO_y$, where x and y are typically non-stoichiometric values, or vice versa in a still further embodiment.

As utilized herein, variables x, y, a, b, and so forth representative of values or ratios of one element with respect to another (or others) in a compound or mixture can have different values (or ranges) suitable for respective compounds/mixtures, and are not intended to denote a same or similar value or ratio among the compounds. Mixtures can refer to non-stoichiometric materials with free elements therein—such as metal-rich nitride or oxide (metal-oxide/nitride with free metal atoms), metal-poor nitride or oxide (metal-oxide/nitride with free oxygen/nitrogen atoms)—as well as other combinations of elements that do not form traditional stoichiometric compounds as understood in the art. Some details pertaining to embodiments of the subject disclosure can be found in the following U.S. patent applications that are licensed to the assignee of the present application for patent: application Ser. No. 11/875,541 filed Oct. 19, 2007 and application Ser. No. 12/575,921 filed Oct. 8, 2009; each of the foregoing patent applications are hereby incorporated by reference herein in their respective entireties and for all purposes in addition to those incorporated by reference elsewhere herein.

Some embodiments of the subject disclosure can employ a bipolar switching device that exhibits a first switching response (e.g., programming to one of a set of program states) to an electrical signal of a first polarity and a second switching response (e.g., erasing to an erase state) to the electrical signal having a second polarity. The bipolar switching device is contrasted, for instance, with a unipolar device that exhibits both the first switching response (e.g., programming) and the second switching response (e.g., erasing) in response to electrical signals having the same polarity and different magnitudes.

Following program or erase pulses, a read pulse can be asserted. This read pulse is typically lower in magnitude relative to program or erase pulses and typically insufficient to affect the conductive filament and/or change the state of the two-terminal memory cell. By applying a read pulse to one of the electrodes of the two-terminal memory, a measured current (e.g., $I_{on}$) when compared to a predetermined threshold current can be indicative of the conductive state of the two-terminal memory cell. The threshold current can be preset based on expected current values in different states (e.g., high resistance state current; respective currents of one or more low resistance states, and so forth) of the two-terminal memory device, suitable for a given two-terminal memory technology. For example, when the conductive filament has been formed (e.g., in response to application of a program pulse), the conductance of the cell is greater than otherwise and the measured current (e.g., $I_{on}$) reading in response to the read pulse will be greater. On the other hand, when the conductive filament is removed (e.g., in response to application of an erase pulse), the resistance of the cell is high because the interface layer has a relatively high electrical resistance, so the conductance of the cell is lower and the measured current (e.g., $I_{off}$) reading in response to the read pulse will be lower. By convention, when the conductive filament is formed, the memory cell is said to be in the "on-state" with a high conductance. When the conductive filament is not extant, the memory cell is said to be in the "off-state". A memory cell being in the on-state or the off-state can be logically mapped to binary values such as, e.g., "1" and "0". It is understood that conventions used herein associated with the state of the cell or the associated logical binary mapping are not intended to be limiting, as other conventions, including an opposite convention can be employed in connection with the disclosed subject matter. Techniques detailed herein are described and illustrated in connection with single-level cell (SLC) memory, but it is understood that the disclosed techniques can also be utilized for multi-level cell (MLC) memory in which a single memory cell can retain a set of measurably distinct states that represent multiple bits of information.

Overview

FIG. 1 illustrates a block diagram of an example integrated circuit device 100 for an electronic device (e.g., a secure device, a digital hard wallet, and the like) according to one or more embodiments of the present disclosure. Integrated circuit device 100 includes an array(s) 110 of two-terminal resistive-switching memory cells (though other magnetic switching or charge-trapping two-terminal memory cells can be utilized instead or in addition, in some disclosed embodiments). Array(s) 110 of memory can include resistive switching memory cells, and different portions of the resistive switching memory cells can be characterized (and re-characterized, where suitable) for different memory cell functions. Example memory cell functions can include physical identifier functions (e.g., PUF, true random number generation (TRNG)), one-time programmable (OTP) functions and many-time programmable (MTP) functions (also referred to as rewritable or program/erase functions). Different groups of memory cells of array(s) 110 are provided (or can be characterized) to implement these functions. Multiple resistive-switching memory cells can be aggregated to define a differential PUF bit (or TRNG bit), or a single cell can define a PUF bit (or TRNG bit) in other embodiments. Thus, depicted in FIG. 1 are PUF memory cells 116, OTP memory cells 114 as well as MTP or rewritable/reversibly programmable memory cells 112. Array(s) 110 of resistive-switching memory cells can be characterized for other types of memory cell functions not specifically depicted in FIG. 1, where suitable.

Figure 3:
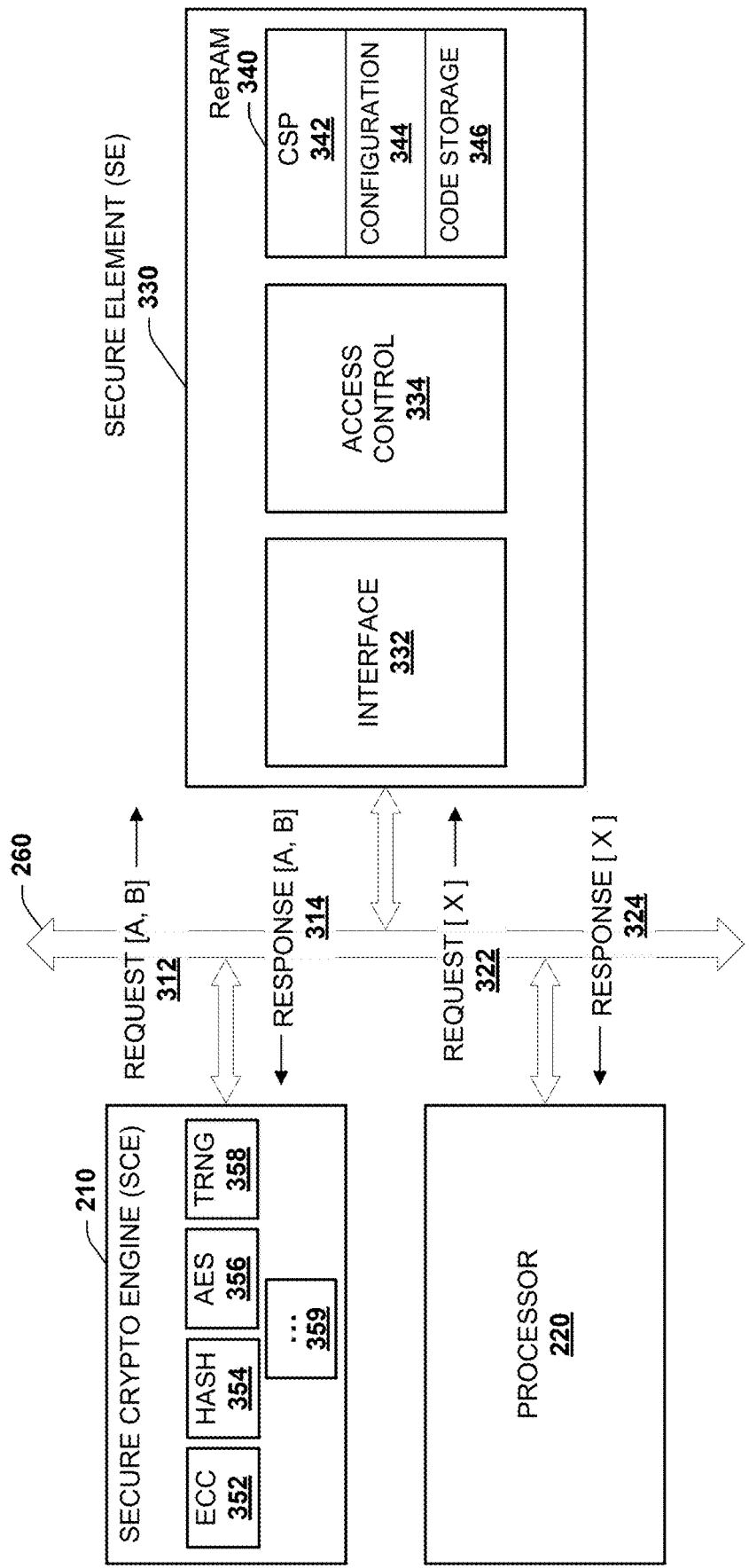
FIG. 3 illustrates a block diagram of an example memory controller device that manages data for security applications in further embodiments of the present disclosure.

As shown, array(s) 110 of two-terminal resistive-switching memory cells can be a unified memory structure in which different portions of a single array define MTP cells 112, OTP cells 114 and PUF cells 116 (e.g., see ReRAM 340 of FIG. 3, infra). In other embodiments, a different array (e.g., having a distinct access control 124) can define one or more of MTP cells, 112, OTP cells 144 or PUF cells 116. In yet another embodiment, each of MTP cells 112, OTP cells 114 and PUF cells 116 can be embodied in distinct resistive switching arrays having respective access controls 124. More generally, one or more of: PUF cells 116, OTP cells 114 and MTP cells 112 can be separate memory structures from array(s) 110 of memory. For example, OTP cells 114 can be located externally to array(s) 110 on a semiconductor chip. Alternatively, in other embodiments, OTP cells 114 (or MTP cells 112, or PUF cells 116) can be at least in part included within array(s) 110 of memory. For instance, OTP cells 114 can be embodied as an array among a set of arrays that form array(s) 110 of two-terminal resistive-switching memory, a block of memory within such an array(s) 110, a set of pages within one or more blocks or arrays, or other suitable arrangement.

Controller 120 is provided to perform operations on array(s) 110 of two-terminal resistive-switching memory cells. Suitable operations can include memory operations, such as reading data from, writing data to, overwriting data at, and so on, subsets of array(s) 110. However, such operations can also include characterizing portions of array(s) 110 (e.g., as PUF bit portions, OTP portions, MTP portions, etc.), defining or modifying configurations or other metadata pertaining to portions of array(s) 110 (e.g., a data configuration table(s); see FIGS. 5-11, infra), among others. Memory operations can include processes such as program (write), read, overwrite, erase, and so forth, suitable for operation of MTP cells 112. Memory operations can also include processes for program (write) or reading OTP cells 114. Still further, memory operations can include processes for generating PUF data on individual PUF cells 116, or on a group(s) of PUF cells 116 defining a differential PUF bit. Instructions for implementing memory operations according to the various characterizations can be stored in trim instructions 122. Memory cell operations can be implemented in response to a command from an external device (by way of command/data interface 130, for example), which can be implemented by a manufacturer post-fabrication of integrated circuit device 100, by a distributor or reseller of integrated circuit device 100 after fabrication, by an end-user as part of a chip calibration routine, or as a dynamic process during operation of integrated circuit device 100, according to various embodiments. As an illustrative example, a host device communicatively coupled to integrated circuit device 100 can issue a host command to generate PUF data; such a host command can include or imply a PUF characterization protocol on memory bits identified in the host command, or a command to characterize cells as a PUF bit(s) can be received separate from a command to generate PUF data from those cells. In various embodiments, trim instructions 122 can store protocols to characterize memory cells according to PUF, MTP, OTP characterizations, as well as implement memory operations consistent with those characterizations.

In some disclosed embodiments, controller 120 can be operable to selectively implement one-time programmable operations on selected PUF bits to render permanent a PUF bit sequence generated with a program event at a set of PUF bits (or, e.g., stored at a set of memory cells in response to generation at other memory cells by a non-program event, such as native leak current or the like). Described differently, a PUF data sequence comprising program and un-programmed bits can be reinforced with a strong program pulse, e.g., a one-time programmable pulse, to make program bits of the PUF data sequence non-erasable and create large sensing margin between the program bits and the un-programmed bits of the PUF data sequence. This can serve to greatly enhance longevity and accurate read cycle counts of the PUF bit sequence.

In addition to the foregoing, controller 120 can be configured to define an arrangement or ordering of resistive switching devices (or groups of resistive switching devices) to create a multi-bit sequence of bits (e.g., including PUF bits, TRNG bits, or code data bits including firmware or other non-erasable OTP bits, as well as fully rewritable MTP bits). In an embodiment, controller 120 can define multi-bit sequences serving as data parameters, including security parameters (e.g., critical security parameters (CSPs)), data configuration parameters defining characteristics associated with a data parameter(s), application code parameters, rewritable data parameters, and so forth (e.g., see FIG. 4, infra).

As one illustrative example of a PUF bit sequence utilized for a security parameter, resistive switching devices 0:7 can be read and assigned to bits 0:7 of a bit sequence. In an alternative embodiment—utilizing pairs of switching devices to define an identifier bit—first resistive switching devices 0:7 in a block of array(s) 110 can be associated with second resistive switching devices (n: n+8) elsewhere in the block of the array(s) 110 (or in another block of the array(s) 110) by controller 120 to define identifier bits 0:7 of a (differential) bit sequence. The variable: n can be any suitable number greater than 7 if in the same block, or any number if in a different block or on a different wordline of the block. However, in particular embodiments the number n can be a multiple of the size of the bit sequence, e.g., for an 8-bit identifier sequence a multiple of n=8: 8, 16, 24, 32, ..., 128, 256, 512, and so forth. In other embodiments, the bit sequence need not be derived from resistive switching devices arrayed in a particular order (consecutive or otherwise). As an example, from an ordinal line of resistive switching devices, devices 15, 90, 7, 21, 50, 2, 37, 19 (and suitable associated groups of other resistive switching devices in the differential programming context, where multiple resistive switching devices define each PUF bit) can be read and respectively assigned to bits 0:7 of an output bit string. The bit string can be of any selected length, defined by a matching number of resistive switching devices (or multiples of the matching number in the differential context). For instance, bit strings of 64 bits, 256 bits, 1024 bits, 64 kbits, or any other suitable subset of array(s) 110 may be employed for a bit string. As another non-limiting illustration, for a 256-bit PUF data sequence utilized for a cryptographic key, controller 120 can characterize a set of memory cells as PUF bits and define an ordering of resistive switching memory cells assigned to the PUF bits to correspond with a sequence of 256 bits. Bit values (e.g., logic levels, ...) generated from the assigned resistive switching memory cells can then be ordered by controller 120 consistent with the device(s) ordering to thereby create the 256-bit identifier sequence. As a specific illustration: where a row of 256 resistive switching devices in an array is selected for generating an identifier sequence, identifier bit values of the 256 resistive switching devices can be arranged in the order the resistive switching devices are physically situated in the row; however, this is an illustrative example only and any other suitable arrangement or ordering can be implemented by controller 120 as an alternative or in addition.

Figure 14:
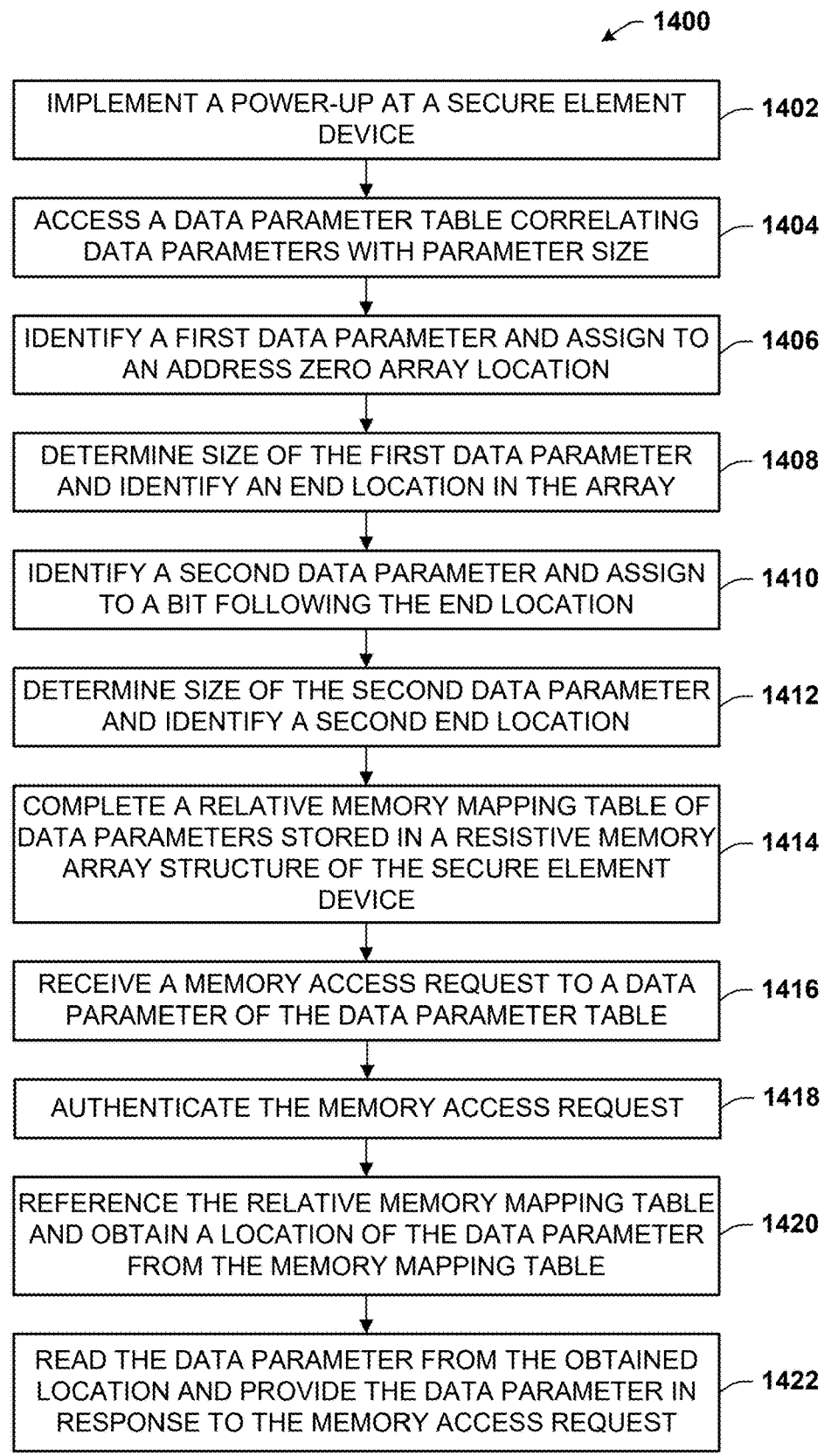
FIG. 14 depicts a flowchart of an example method for generating data parameter array locations for a secure element device according to embodiments of the present disclosure.

In should be understood that operations, configurations, characteristics and various illustrations and descriptions of controller 120 can be applicable to other controllers disclosed herein in various embodiments (e.g., with reference to FIG. 14, infra, memory array 1402 and components of operating environment 1400 configured for control of operations of memory array 1402). Conversely, operations, configurations, characteristics and various illustrations and descriptions of other controllers disclosed herein can be applicable to controller 120 in one or more embodiments.

Trim instructions 122 can comprise rules for implementing one or more functions or operations of controller 120, access control 124 or array(s) 110 of resistive-switching memory disclosed herein. With respect to controller 120, trim instructions 122 can comprise rules for characterizing one or more groups of resistive switching devices of array(s) 110 as PUF cells 116, OTP cells 114 or MTP cells 112, rules for defining multiple resistive switching cells 116 to form differential PUF bits (or TRNG bits), rules for generating or modifying configurations for stored data parameters (e.g., see FIGS. 5 and 6, infra), rules for generating predefined parameter configurations (e.g., see FIG. 7), rules for correlating parameter configurations with stored data parameters (e.g., see FIGS. 8-11), rules for implementing memory operations on memory cells suitable to a particular characterization, and so forth.

Also illustrated in integrated circuit device 100 is an input(s) 140 and output(s) 150. In some embodiments, input(s) 140 can include (or provide a pathway for) data to be stored within array(s) 110 of two-terminal resistive-switching memory cells, such as MTP cells 112 or OTP cells 114. Output(s) 150 can output data stored within resistive switching devices of array(s) 110, including PUF cells 116 as well as OTP cells 114 and MTP cells 112. In some embodiments, output(s) 150 can output data that results from computations utilizing data stored in PUF cells 116 or stored within MTP cells 112 or OTP cells 114 resulting from such computations, in further embodiments.

A command/data interface 130 is provided to receive memory commands from an external device and respond to those commands. Further, data to be written to array(s) 110 can be received by way of command/data interface 130, and data output from array(s) 110 can be provided over command/data interface 130. In at least some embodiments, controller 120 can dynamically expose selection, operation or (re-)characterization of memory cells of array(s) 110 to an external host device (separate from integrated circuit device 100—not depicted) by way of command/data interface 130. In various example implementations, the external host device can be manufactured separately and communicatively interconnected by one or more network or device interfaces (e.g., see FIG. 15, infra) to command/data interface 130 to accomplish this embodiment(s).

Figure 2:
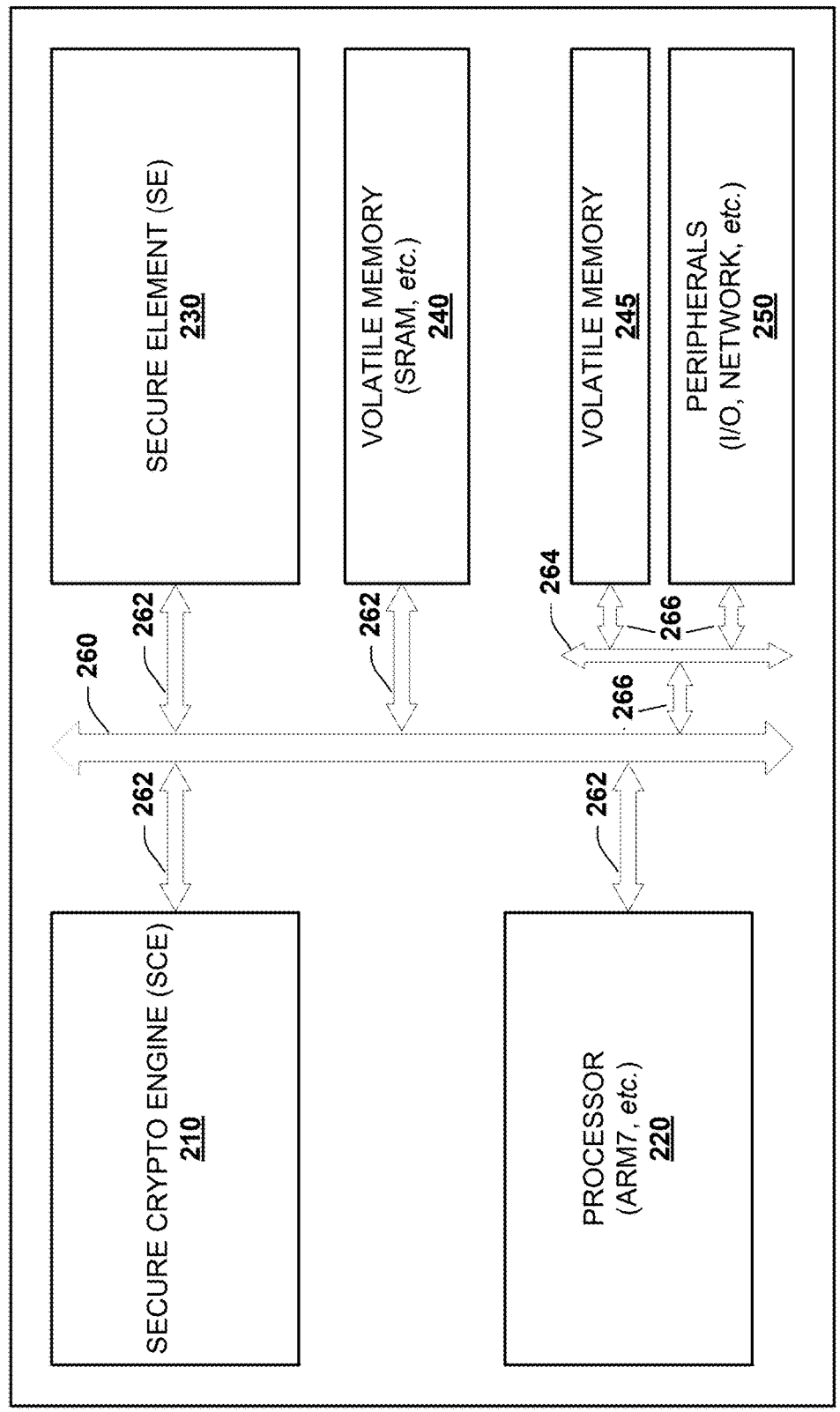
FIG. 2 depicts a block diagram of an example memory controller operative with a secure element device in further embodiments.

FIG. 2 illustrates a block diagram of an example memory controller device 200 according to various embodiments of the present disclosure. Memory controller device 200 includes a secure crypto engine (SCE) 210 and a secure element 230 coupled to a communication bus 260 by respective communication bus interfaces 262. Secure crypto engine 210 can include a crypto engine processor 212 in one or more embodiments, that can be leveraged by secure crypto engine 210 (as well as sub-modules thereof, see, e.g., FIG. 3, infra) to execute operations, code instructions, logic instructions, and the like, of secure crypto engine 210. Such operations, instructions, etc., can include cryptographic applications, for example: generating cryptographic key data stored in secure element 230, validating cryptographic key(s) data against a key(s) stored in secure element 230, initiating a secure connection with a remote device (not depicted, but see FIG. 15, infra) utilizing a cryptographic key validation in conjunction with data encryption, or the like or a suitable combination of the foregoing. Read access requests or write access requests (e.g., a PUF write for generating a secure data parameter) issued by secure crypto engine 210 can include a SCE identifier 214 to distinguish secure crypto engine 210 as a source of the read access request or write access request. This SCE identifier 214, along with other data, can be provided in a read access request or write access request submitted on communication bus 260 by way of communication bus interface 262.

In one or more embodiments, communication bus 260 can be an Advanced eXtensible Interface (AXI interface). The AXI interface can be utilized for communication bus 260 where memory controller device 200 is embodied by a single chip or die, as one suitable example. In some embodiments, communication bus 260 can be an advanced microcontroller bus architecture (AMBA®) bus, or suitable variations thereof introduced by ARM Ltd. (e.g., an advanced system bus (ASB), an advanced peripheral bus (APB), an AMBA High performance Bus (AHB), AMBA 3, Advanced Trace Bus (ATB), AMBA 4 AXI4, AMBA 4 AXI Coherency Extensions (ACE), AMBA 5 Coherent Hub Interface (CHI), and so forth). However, the subject disclosure is not so limited, and other communication bus 260 architectures can be implemented, including public bus architectures, proprietary bus architectures, or suitable combinations of the foregoing.

Secure element 230 can be configured to receive data requests (e.g., read requests or write requests) over communication bus 260. Moreover, secure element 230 is configured to selectively approve or deny data requests based on satisfaction (or failure to satisfy) of predetermined conditions. In an embodiment, approval or denial of a data request can depend (at least in part) on proper inclusion of SCE identifier 214 within the data request. For instance, a requesting module identifier field (e.g., see FIG. 3, infra) of the data request can be parsed by secure element 230 to determine whether SCE identifier 214 is properly included therein. Approval or denial of the data request can be conditioned by secure element 230 on successfully parsing the data request and extracting SCE identifier 214 therefrom.

In further embodiments, approval or denial of the data request can depend at least in part on a sub-block identifier included in the data request, as described in more detail hereinbelow (e.g., see also FIGS. 3-5, infra). Optionally, secure element 230 can enforce a (correct) sub-block identifier requirement for approval or denial of the data request for some module identifiers, but not for other module identifiers. For example, secure element 230 can be configured to require a valid sub-block identifier upon detecting a first requesting module identifier in the requesting module identifier field (e.g., SCE identifier 214 of secure crypto engine 210) and can be configured to ignore the sub-block identifier upon detecting a second requesting module identifier in the requesting module identifier field (e.g., a processor identifier 224 of processor 220; see below). Alternatively, secure element 230 can enforce a sub-block identifier requirement for approval or denial of the data request for some target data sets (or data address locations, in the case of a write data request) but not for other target data sets (or data address locations). As an illustrative example, referring briefly to FIG. 4, infra, secure element 230 can enforce a sub-block identifier requirement for parameter 1 in slot 1 of a security parameter table stored in secure element 230 (e.g., stored within an array(s) 110 of two-terminal resistive-switching memory; see FIG. 3, infra) but not for parameter 3 of slot 3, or another suitable configuration. Distinctions between slot 1 and slot 3 can be defined in configuration data associated with slots 1 and 3 (e.g., see FIG. 6, among others), and the different sub-block requirement responses pertaining to those distinctions can be stored in trim settings 122 of a controller 120 of secure element 230 as described above with respect to FIG. 1, supra. In further embodiments, secure element 230 can enforce a sub-block identifier requirement for other conditions not explicitly stated but that one of ordinary skill in the art would reasonably infer from those explicitly described herein, or for any suitable combination of the foregoing.

In an additional embodiment(s), approval or denial of the data request can depend (at least in part) on configuration data associated with a set of data (or data address locations) targeted by a data request. As another illustrative example, approval or denial of the data request can depend (at least in part) on a module identifier within a requesting module identifier field matching a module identifier stored by secure element 230 in conjunction with the set of data, and can depend on a sub-block identifier within a sub-block identifier field of the data request matching a sub-block identifier stored by secure element 230 in conjunction with the set of data.

In additional aspects of the disclosed embodiments, memory controller device 200 can comprise volatile memory 240 coupled to communication bus 260 by a communication interface 262. A processor 220 is also provided, communicatively connected to communication bus 260, and can include an ARM processor (e.g., ARM7 or any other suitable iteration) or other general purpose processing or multi-processing hardware (e.g., see FIG. 15, infra). Processor 220 can also issue data requests to secure element 230 (e.g., read requests, write requests, rewrite requests, and so forth), and secure element 230 can selectively approve or deny the data requests. Processor 220 can execute general purpose applications including non-secure applications, having some or all data thereof stored in secure element 230. In some embodiments, processor 220 includes a processor identifier 224 that can be submitted in the requesting module identifier field as introduced above. Secure element 230 can approve or deny a data request based on identifying processor identifier 224 within the data request, based on that data request targeting a set of data associated with processor identifier 224 by secure element 230 (e.g., see FIG. 5), or the like, or a suitable combination of the foregoing. In various aspects of the disclosed embodiments, sets of data associated with processor identifier 224 can be stored in OTP cells 114 (e.g., code data, logic data, firmware, etc.) or MTP cells 112 (e.g., code data, logic data, operating data, application data, and so forth), whereas sets of data associated with SCE identifier 214 can be stored in PUF cells 116 (e.g., critical security parameter (CSP) data, cryptographic key data, hash function data, true random number generation data, security validation data, and the like), although the subject disclosure is not limited to these aspects.

Memory controller device 200 can also include one or more peripheral devices 250, such as input/output devices, network devices, and the like, and additional volatile memory 245 supporting operation of secure crypto engine 210 and processor 220 with peripheral devices 250. Peripherals 250 and volatile memory 245 can be coupled to a secondary communication bus 264 (e.g., an AHB bus) by respective bus interfaces 266. Secondary communication bus 264 can also be communicatively coupled to communication bus 260 to facilitate communication and interoperation between peripherals 250 and volatile memory 245 and other components of memory controller device 200 (e.g., secure crypto engine 210, processor 220, secure element 230, etc.).

FIG. 3 illustrates a block diagram of an example memory control environment 300 according to further embodiments of the present disclosure. Memory control environment 300 includes a secure element 330 in communication with a secure crypto engine 210 and in communication with a processor 220 by way of a communication bus 260. Though not explicitly depicted, memory control environment 300 can include other electronic devices, processors, applications, and so forth in communication with secure element 330. In various embodiments, communication bus 260 can be a wired communication interface, a wireless communication interface, a network communication interface, an internet communication interface, or the like, or any suitable combination of the foregoing (e.g., see FIG. 15, infra). In some embodiments, communication bus 260 is an on-chip interface providing communication between components of a single chip, and secure element 330, secure crypto engine 210 and processor 220 can likewise be formed within a single semiconductor chip. However, the subject disclosure is not limited to this particular example and in other embodiments secure element 330, secure crypto engine 210 and processor 220 can be embodied on a plurality of semiconductor chips and communication bus 260 can provide inter-chip communication or both intra-chip communication and inter-chip communication.

As shown, memory control environment 300 illustrates example memory requests and responses to such requests, including data fields and data parameters pertinent to operations of access control 334 of secure element 330. Secure element 330 includes a ReRAM 340 as depicted, and is communicatively and operationally coupled to access control 334. In some embodiments, access control 334 can be coupled with and control ReRAM 340 at least in part by an array control environment as shown in FIG. 14, infra. In operation, access control 334 can receive and process access requests to data stored at ReRAM 340. As described herein, processing access requests can include validating (or invalidating) the access request as well as implementing (or rejecting) a memory operation contained therein.

Memory controller device 300 depicts ReRAM 340 in a unified embodiment. As such, differently characterized data parameters are stored in a single array managed by access control 334. Moreover, ReRAM 340 can include a first portion of resistive switching memory cells characterized as PUF cells, and a second portion characterized as OTP cells and optionally a third portion characterized as MTP cells. Different data parameters can be stored in differently characterized memory cells, as described herein.

A secure crypto engine 210 is shown communicatively coupled to secure element 330 by way of communication bus 260. Additionally, secure crypto engine 210 is depicted having several sub-modules, including an elliptic curve cryptography (ECC) cryptographic sub-module 352, a hash sub-module 354, an advanced encryption standard (AES) cryptographic sub-module 356, a true random number generation (TRNG) application sub-module, and other sub-modules 359 (referred to hereinafter collectively as: sub-modules 352-359). The latter can include other types of cryptography applications (data encryption standard (DES) cryptography, etc.), as well as user validation applications (e.g., a user password/PIN application), or the like. Sub-modules 352-359 can utilize hardware and software resources of secure crypto engine 210, such as an embedded processor and memory (not depicted), to execute instructions associated with such sub-modules 352-359. In addition, sub-modules 352-359 can utilize resources of secure crypto engine 210 to generate data access requests—such as request [A, B] 312—to obtain data, code instructions, or the like stored at secure element 330 as part of executing instructions of sub-modules 352-359. A communication interface of secure crypto engine 210 can be utilized to transmit those data access requests on communication bus 260 to secure element 330, and a response(s) from secure element 330 can likewise be received at the communication interface by way of communication bus 260.

Interface 332 of secure element 330 is communicatively coupled to communication bus 260 and receives request [A, B] 312 there from. Request [A, B] 312 includes a plurality of data fields consistent with a communication protocol defined for communication bus 260, including a module identifier in a module identifier field: A and a sub-module identifier in a sub-module identifier field: B. For the present example depicted in FIG. 3, the module identifier is an identifier of secure crypto engine 210 that distinguishes secure crypto engine 210 from other modules (e.g., such as processor 220), and the sub-module identifier is an identifier of one of sub-modules 352-359 distinguishing the one sub-module from other sub-modules. Access control 334 can extract the module identifier and sub-module identifier from data fields of request [A, B] 312 as well as a memory operation specified therein. For instance, in the case of request [A, B] 312 specifying a read operation, access control 334 can determine a data parameter (or memory locations of the data parameter) stored at ReRAM 340 identified by the read operation. In an embodiment, access control 334 is configured to first validate request [A, B] 312 before executing a memory operation contained therein, and where validation fails access control 334 can be configured to not execute the memory operation. A response [A, B] 314 to successful execution of request [A, B] 312 can be transmitted by secure element 330 to secure crypto engine 210, including the module identifier in module identifier field: A as well as the sub-module identifier within sub-module identifier field: B. This enables secure crypto engine 210 to identify responses pertinent to its own request [A, B] 312 (from the module identifier field: A) and enables sub-modules within secure crypto engine 210 to identify responses pertinent to their respective requests (from the sub-module identifier field).

In addition to identifying a source of a request/response, access control 334 can utilize data included within request [A, B] 312 to determine whether to execute or not execute a memory operation specified therein. In some embodiments, for example where the request targets a critical security parameter (CSP) stored in CSP data 342, access control 334 can reference configuration data 344 associated with the targeted security parameter and determine whether the module identifier provided with the request is permitted to access the targeted security parameter (e.g., see configuration definitions 510 of FIG. 5, infra). If the module identifier does not have permission, access control 334 can reject the request, refrain from providing access to the targeted security parameter, or the like. Where the module identifier is associated with permission to access the targeted security parameter, access control 334 can further compare a sub-module identifier with additional configuration data to determine whether the sub-module identifier is compatible with the targeted security parameter. If so, access control 334 can optionally proceed with further validation of the request. Such further validation can include additional processes specified in configuration data 344 for the targeted security parameter, such as requiring a user login to a valid user account associated with the targeted security parameter, or other suitable validation. Once all validation specified in configuration data 344 is successfully completed, access control 334 can execute the memory operation contained within request [A, B] 312 and respond with a result of the memory operation within response [A, B] 314, such as data requested as a read operation, or validation of a successful write operation (or notice of a failed write operation), as suitable.

In the embodiment(s) illustrated by FIG. 3, configuration data 344 associated with data stored in ReRAM 340 can also be stored in ReRAM 340. This can provide resistance to side-channel hacking attempts, as well as resistance to brute-force hacking attempts achievable through highly non-correlated data sources such as PUF cells of a resistive switching memory structure. In such embodiments, CSP data 342 can be stored in PUF cells, and configuration data 344 can be stored in OTP cells or MTP cells (or at least a portion of configuration data 344 can also in PUF cells, where suitable). In other embodiments, configuration data 344 can instead be stored at embedded memory within access control 334 (not depicted), or within a separate memory structure of secure element 330 (also not depicted) or a suitable combination of the foregoing examples.

ReRAM 340 can also contain code data contained in code storage 346. Code data can be instructions for executing an application on a processor, as would be understood to one of ordinary skill in the art. Code data can also include fixed data for executing the instructions, or rewritable data for executing the instructions or maintained in association with executing the instructions. Such code data can be utilized by a processor 220. Processor 220 can issue a request [X] 322 for code data specifying a processor identifier within a module identifier field: X of request [X] 322. No sub-module identifier is required, and moreover access control 334 can maintain a different set of conditions for validating request [X] 322 of processor 220 for code data located at code storage 346 than the set of conditions described above for validating request [A, B] 312 for CSP data 342. Upon validating request [X] 322, access control 334 can execute a memory operation specified therein and issue a response [X] 324 to the memory operation, including the processor identifier in response [X] 324.

Validation of request [X] 322 for code data 346 can be according to one or more suitable conditions. In an embodiment, configuration data 344 can merely require a data parameter specified in request [X] 322 to be identified as code storage 346 as a condition for validation of request [X] 322 from processor 220. In another embodiment, configuration data 344 can require data parameters identified as code storage 346 to be correlated with the processor identifier and successful comparison of data contained within module identifier field: X to the processor identifier as a condition for validation of request [X] 322 from processor 220. In yet another embodiment, the condition for validation of request [X] 322 can be an access flag associated with the requested data parameter specifying access by processor 220 (e.g., see FIG. 5, access type 512, infra). Other suitable implementations known to one of skill in the art or reasonably conveyed to one of skill in the art by way of the context provided herein are considered within the scope of the present disclosure.

Figure 4:
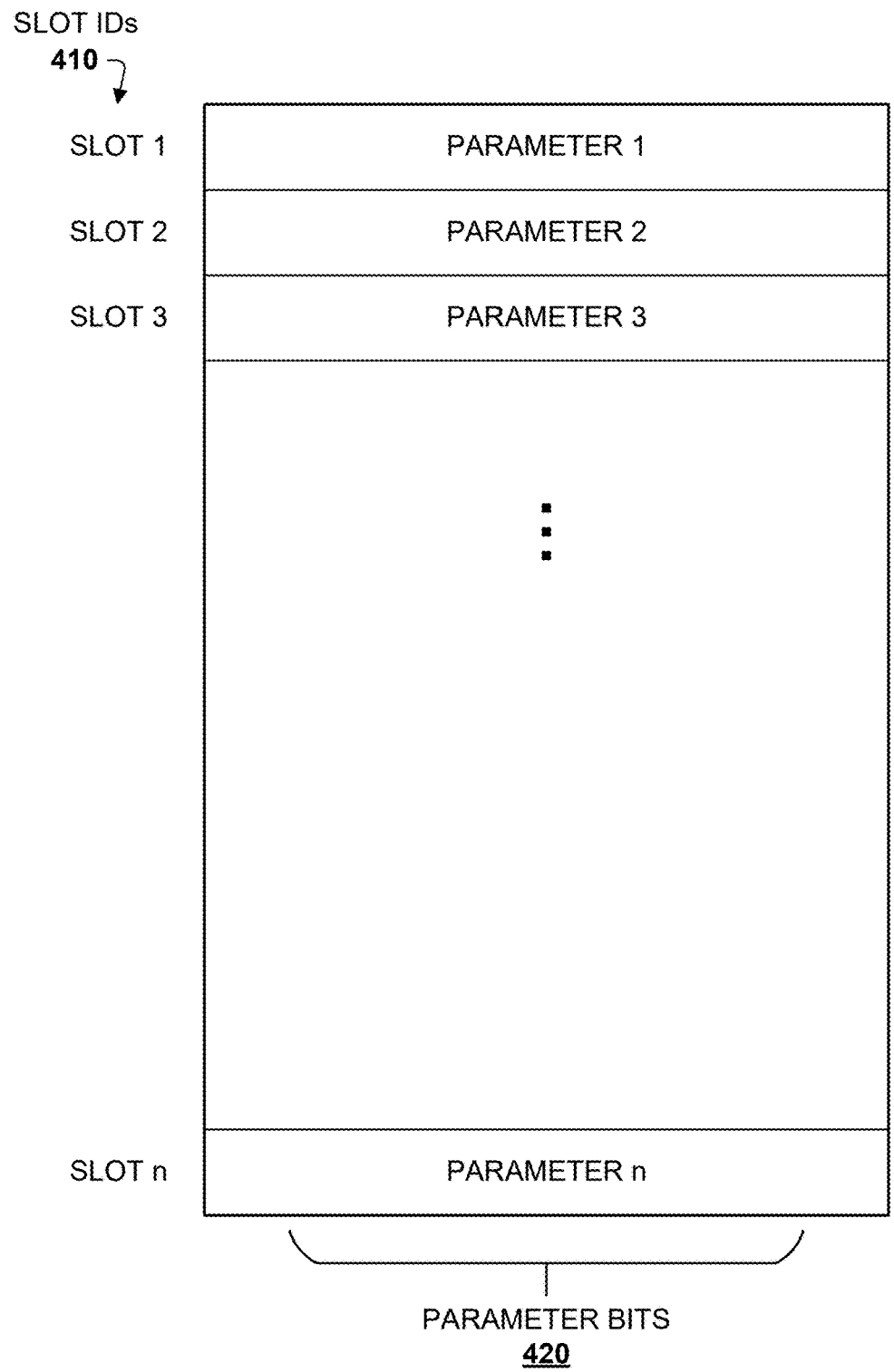
FIG. 4 depicts a diagram of data parameters stored at a two-terminal data storage device managed by a secure controller device disclosed in various embodiments.

FIG. 4 depicts a diagram of an example parameter table 400 stored in a secure element in various aspects of the disclosed embodiments. Parameter table 400 can include critical security parameters as denoted in FIG. 4. However, parameter table 400 need not be limited to critical security parameters. Rather, configuration data, code data and even rewritable application data can also be stored in parameter table 400. To differentiate among different types of data, parameter table 400 can be associated with configuration data (e.g., see FIG. 5) to define different access controls for validating access to respective data parameters stored at parameter table 400.

As shown, parameter table 400 includes a set of data parameters: parameter 1, parameter 2, parameter 3, . . . through parameter n, where n is any suitable integer greater than 1. Respective parameter bits 420 (e.g., of ReRAM 340) embody each of the stored data parameters. It should be appreciated that parameter bits 420 can comprise different numbers of bits for each parameter, as suitable. For instance, where parameter 1 is a 512 bit cryptographic key and parameter 2 is a 256 bit cryptographic key, parameter bits 420 embodying parameter 1 can include at least 512 bits of memory, whereas parameter bits 420 embodying parameter 2 can include at least 256 bits of memory, as suitable. Accordingly, parameter bits 420 can vary per parameter and need not be a uniform size or number of bits.

Each parameter of parameter table 400 is associated with a slot identifier (ID) 410. Slot IDs 410 provide ease of reference for each parameter, allowing a parameter to be identified by a slot ID 410 rather than the parameter itself. In some embodiments, a slot ID 410 of a given parameter can be exposed to an external device (e.g., secure crypto engine 210; processor 220) and an access request may include the slot ID 410 associated with the particular parameter targeted for the access request. In other embodiments, slot IDs 410 can be maintained internal to secure element 330 and only an abstraction of the slot IDs 410 exposed to the external device(s). In still other embodiments, some slot IDs 410 can be exposed to an external device (e.g., for code storage 346) whereas other slot IDs 410 can be maintained internal to secure element 330 (e.g., CSP data 342 or configuration data 344).

Access to parameters of parameter table 400 can be defined by configuration data maintained by access control 334. Some configuration data can define general access control for any parameter of parameter table 400. Other configuration data can define specific access control for individual parameters (or groups of parameters) of parameter table 400. Specific access control for some parameters can be in addition to general access control for all parameters, in at least one embodiment. In other embodiments, each parameter can have specific access control in lieu of any general access control.

In one or more aspects of the disclosed embodiments, the configuration data can include a number of predefined access control characteristics. Parameters conforming to one of the predefined access control characteristics can be associated therewith by way of a link table. The predefined access control characteristics can be defined for sets of characteristics that are common to many parameters of parameter table 400, as one example. The link table can then merely correlate an identifier of a predefined access control characteristics to such parameters and reduce a size of configuration memory required to define configuration characteristics for each of the parameters of parameter table 400.

FIG. 5 depicts an example configuration table 500 for parameters of parameter table 400 according to embodiments of the present disclosure. Configuration table 500 provides characteristic definitions in respective rows of configuration table 500, and information about respective definitions in columns thereof. A first column (left side of table) provides a configuration definition 510, followed by an example number of bits 520 to characterize the definition and a description 530 of the definition as applied to a parameter in the context of a disclosed memory control environment (e.g., memory control environment 300 of FIG. 3, supra). It should be appreciated that configuration table 500 is exemplary only, and different parameter definitions can be provided, with associated (and different) descriptions and numbers of bits. Still further, different numbers of bits can be provided for the same definitions 510 where suitable, for instance where fewer (or more) modules are anticipated fewer (or more) bits can define module accessibility 512. Likewise, other numbers of bits suitable to define other parameters can be provided in other embodiments. As noted previously, configuration table 500 can be stored in configuration data 344 of ReRAM 340 in some embodiments, whereas in other embodiments configuration table 500 can be stored in embedded memory of access control 334, or in a separate memory structure (not depicted), or a suitable combination of the foregoing.

Referring initially to the left-hand column and definitions 510, a first definition is an access type 512 configuration defining a module permitted to access an associated parameter of parameter table 400. In the embodiment shown, 4 bits are utilized for access type 512, with each bit specifying a requesting module, application, or the like. A first (rightmost) bit defines whether an associated parameter is accessible by secure element 330 ('1' value) or not accessible by secure element 330 ('0' value). A second (from the right) bit defines whether the associated parameter is accessible by secure crypto engine 210 ('1' value) or not accessible by secure crypto engine 210 ('0' value). Likewise, a second (from the left) bit defines whether the associated parameter is accessible by a user application ('1' value) or not accessible by the user application ('0' value), and lastly a last (left-most) bit defines whether the associated parameter is accessible by processor 220 ('1' value) or not accessible by the processor 220 ('0' value). The bit definition of description 530 enables a mixture of several different accessibility states for four different types of modules, which can be specified by a module identifier of a memory access request. This bit definition also permits any suitable subset of accessibility definitions: such as accessibly by a secure element and by a secure crypto engine, but not a user application or processor, and various other combinations.

A second definition is a crypto type 513 definition. Crypto type 513 can be a sub-category of access type 512, in an embodiment, that is active only when access type 512 is limited to secure crypto engine 210 (or optionally secure element 330). When such condition is met, crypto type 513 can define a cryptographic protocol to which an associated parameter adheres. The examples defined for configuration table 500 include a hash-based message authentication code (HMAC) cryptographic key, an AES cryptographic key and an ECC cryptographic key, though other key protocols and key definitions can be included in addition to, or instead of, those specified (with a suitable number of bits 520). In various embodiments of the present disclosure, crypto type 513 can correspond with a sub-module identifier of a cryptographic application operating on a secure crypto engine 210. Where a sub-module identifier of a memory operation matches the type of key specified by crypto type 513, the memory operation can be (at least partially) validated. Where the sub-module identifier does not match the type of key, the memory operation can be rejected.

A third definition 510 is a read authentication flag 514, and can comprise a single bit specifying whether reading an associated parameter requires authentication. The authentication can be media access control (MAC) authentication of a device submitting the access request, or a user authentication (e.g., user password authentication, user PIN authentication, etc.) of a user operating the device (or application). If read authentication is required, a read authentication slot 515 can define which slot of parameter table 400 contains the data string against which the read authentication is to be validated. The data string can be a MAC address of a requesting device, a user passcode, a user PIN, or even a cryptographic key to be authenticated against according to a cryptographic key-pair protocol, as suitable.

A fourth definition 510 can include a counter control definition 516, defining whether use of a parameter or access to the parameter is limited to a number of uses/accesses. Subsequent definitions 510 deal with write access, and includes a write configuration flag 519 specifying whether the data parameter is write enabled, and if so, whether writing to the parameter requires prior authentication 517, and which authentication slot 518 stores the data parameter for write authentication. As stated previously, configuration table 500 is provided as an illustrative example and is not intended to limit a number of configuration definitions 510 that can be employed, a number of bits 520 for characterizing each definition 510 or the associated description (and protocols) for implementing each definition by a disclosed access control 334.

FIG. 6 depicts an example configuration dataset 600 defining characteristics of data parameters stored at a disclosed secure element, according to further embodiments of the present disclosure. Configuration dataset 600 can have the definitions 510 and descriptions 530 of configuration table 500 in one or more embodiments, though the subject disclosure is not limited to these embodiments and configuration dataset 600 can comprise other definitions with other descriptions for characterizing stored data parameters within the scope of the present disclosure. Configuration dataset 600 can be correlated with data parameters of a secure data store (e.g., ReRAM 330) by an access control (e.g., access control 334) associated with that secure data store.

In the example configuration dataset 600 shown by FIG. 6, CSP table 400 is combined with configuration table 500 such that each slot ID 410 correlates a stored data parameter with a configuration data string defining characteristics of that data parameter. Stored data parameters are embodied by respective sets of parameter bits 420 in each slot ID 410, and respective configuration data strings are embodied by respective sets of configuration bits 620 in each slot ID 410. Similar to configuration table 500, configuration bits 620 include the following definitions: access type 628, crypto type 627, read authentication flag 626, read authentication slot 625, counter 624, write enable/disable 621 and for slots write enabled: a write authentication flag 623 and write authentication slot 622. For configuration dataset 600, configuration bits 620 include sufficient bits for each of the above definitions. Utilizing the number of bits 520 specified in configuration table 500, configuration bits 620 include eighteen bits for each slot ID 410 containing a data parameter. Thus, to characterize n data parameters, configuration dataset 600 provides n×18 configuration bits 620 for configuration dataset 600.

To reduce the number of configuration bits 620 required to characterize data parameters, FIG. 7 discloses example predefined configuration definitions 700 according to still further embodiments of the present disclosure. Predefined configuration definitions 700 can be maintained by an access control 334 of a disclosed secure element 330, and can be correlated by access control 334 with suitable data parameters to characterize those data parameters (e.g., see FIG. 8). Predefined configuration definitions 700 can be selected to have respective subsets of definitions 510 that are common to many stored data parameters, to reduce a number of the predefined configuration definitions 700 maintained by access control 334. Moreover, the predefined configuration definitions 700 can have definition identifiers, labels or the like requiring only a few or a couple bits to distinguish from other such definitions. The definition identifiers can be written to slots of a configuration dataset to (indirectly) characterize stored data parameters according to the predefined configuration definitions 700 (e.g., see FIG. 8). This reduces the configuration data bits required to characterize the data parameters. Instead of bits sufficient to populate each of definitions 510 then, each data parameter that can be characterized by one of predefined configuration definitions 700 requires only the few or couple bits that distinguishes one predefined definition from others. For a specific illustrative example, where the four predefined configuration definitions depicted in FIG. 7 are used: slot configuration type 1 710, slot configuration type 2 720, slot configuration type 3 730 and slot configuration type M 740 (with M=4 in this example, but otherwise M equaling any suitable positive integer), just two bits are required to distinguish any one of the slot configuration types from the other three. Thus, instead of 18 bits required to characterize each of the n data parameters of FIG. 4, those data parameters that can be characterized by the four illustrated predefined configuration definitions can be characterized with only two bits each.

As shown in FIG. 7, slot configuration type 1 710 provides three definitions: an access type 612 defined as: readable only by secure element (SE), a crypto type 613 defined as: HMAC key 613 (and thus requiring a submodule identifier of a Hash application) and not writable 619. Slot configuration type 2 720 has an access type 612 defined as: readable only be secure crypto engine, a crypto type 613 defined as: AES key and not writable 619. Slot configuration type M 740 provides four definitions: an access type 612 defined as: readably only by microprocessor, a read authentication flag 614 requiring authentication to read, a read authentication slot 615 defined as: slot 'X' (where X is any suitable integer slot number) and not writable 619. Similarly, slot configuration type 3 730 provides seven definitions. These include an access type 612 defined as: readable only by secure crypto engine, a read authentication flag 614 requiring authentication to read, and a read authentication slot 615 defined as: slot 1. Additionally, the crypto type 613 is defined as: HMAC key 613, the data parameter is writable 619, a write authentication flag 617 requires authentication to write and the write authentication slot 618 is defined as: slot 3.

As stated previously, predefined configuration definitions 700 are illustrative only, and not limiting. Other permutations of definitions 510 are within the scope of the present disclosure, as well as combinations of suitable subsets of those definitions 510. Moreover, predefined configuration definitions 700 can utilize additional definitions not specified herein but known in the art or reasonably conveyed to one of ordinary skill in the art by way of the context presented herein. Further, suitable combinations of one or more of definitions 510 and such additional definitions 510 not explicitly described herein but known or inferable by one of skill in the art are considered within the scope of the present disclosure.

FIG. 8 depicts a block diagram of an example access control configuration database 800 according to alternative or additional embodiments of the present disclosure. Access control configuration database 800 can be maintained by a disclosed access control device for managing data stored in memory, such as ReRAM 340. In some embodiments, access control configuration database 800 can also be stored in ReRAM 340 (e.g., within configuration data 344). However, the subject disclosure is not limited to these embodiments, and in other aspects of the present disclosure access control configuration database 800 can be stored within embedded memory of the access control device (e.g., within embedded memory of access control 334—not depicted), or can be stored within a separate memory structure of secure element 330 communicatively coupled to the access control device (also not depicted), or a suitable combination of the foregoing.

Access control configuration database 800 can include a configuration definitions table 805 that correlates predefined configuration definitions with a configuration identifier 815. These predefined definitions can be as described at FIG. 7 supra with respect to predefined configuration definitions 700 (including any of slot configuration types 710-740). Each predefined configuration definition is embodied by a data string of configuration bits 620. Configuration definitions table 805 then provides a configuration identifier 815 for each data string of configuration bits 620.

A link table 810 is also provided that associates one of the configuration identifiers 815 with a slot identifier 410 of a stored data parameter table such as CSP data table 400 of FIG. 4 supra. Access control configuration database 800 allows an access control device to define each predefined configuration definition 700 with a single set of configuration bits, eliminating redundancy of storing that same definition for each slot identifier 410 having the same configuration characteristics. Instead, a configuration identifier 815 embodied by significantly fewer type ID bits 820 (e.g., two bits, three bits, four bits, five bits, . . . ) compared to the data string of configuration bits 620 (e.g., eighteen bits in the number of bits 520 provided for definitions 510 of FIG. 5) can be stored for each slot identifier 410 in link table 810. This can reduce the memory space required to characterize stored data parameters, and can be especially effective for large numbers of stored data parameters (e.g., hundreds, thousands or even tens of thousands or more stored data parameters). Stated differently, where configuration dataset 600 provides n×18 configuration bits 620 for characterizing n stored data parameters, link table 810 can require only n×m type ID bits 820 plus a single set of configuration bits 620 per configuration identifier 815 of configuration definitions table 805 to do the same. In various embodiments, m can be between 1 and 5 bits, or other number of bits fewer than 18 (e.g., two bits for the slot configuration types 710-740 shown in FIG. 7).

Figure 9:
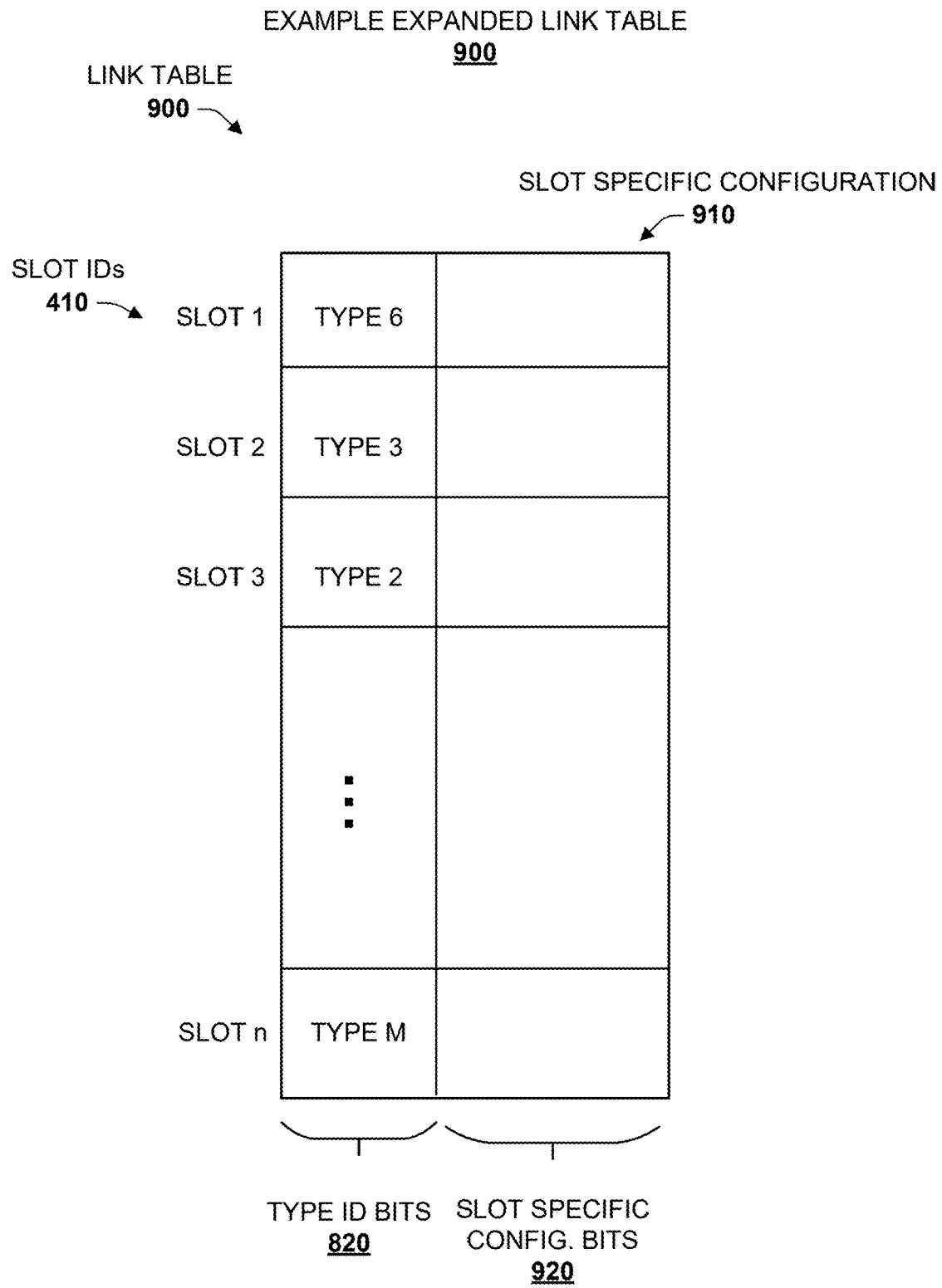
FIG. 9 illustrates an example configuration and access link table defining slot-specific configurations for stored data parameters in further embodiments.

FIG. 9 depicts a block diagram of an example expanded link table 900 according to further embodiments of the present disclosure. Expanded link table 900 includes slot identifiers 410 for stored data parameters correlated with type ID bits 820. Each unique type ID bits 820 is associated with a predefined configuration definition 700 of a configuration definitions table 805, as described above at FIG. 8. In addition, expanded link table 900 provides slot specific configurations 910. Slot specific configurations 910 can include one or more bits that further define a stored data parameter at a given slot identifier 410, in addition to the definitions of a predefined configuration definition 700 associated with the slot identifier 410 by type ID bits 820. Slot specific configurations 910 can facilitate customizing a characterization of a stored data parameter in addition to the definitions 510 provided by a general configuration definitions database, such as configuration table 500. The slot specific configurations are embodied by slot specific configuration bits 920.

In some embodiments, data parameters fully characterized by a predefined configuration definition 700 referenced by type ID bits 820 can have no slot specific configuration bits 920 associated with that slot identifier 410. Thus, slot specific configuration bits 920 can be added only to those stored data parameters for which customized characterization is required. In such embodiments, slot specific configuration bits 920 can vary from zero to a positive integer number of bits for each slot identifier 410.

Figure 10:
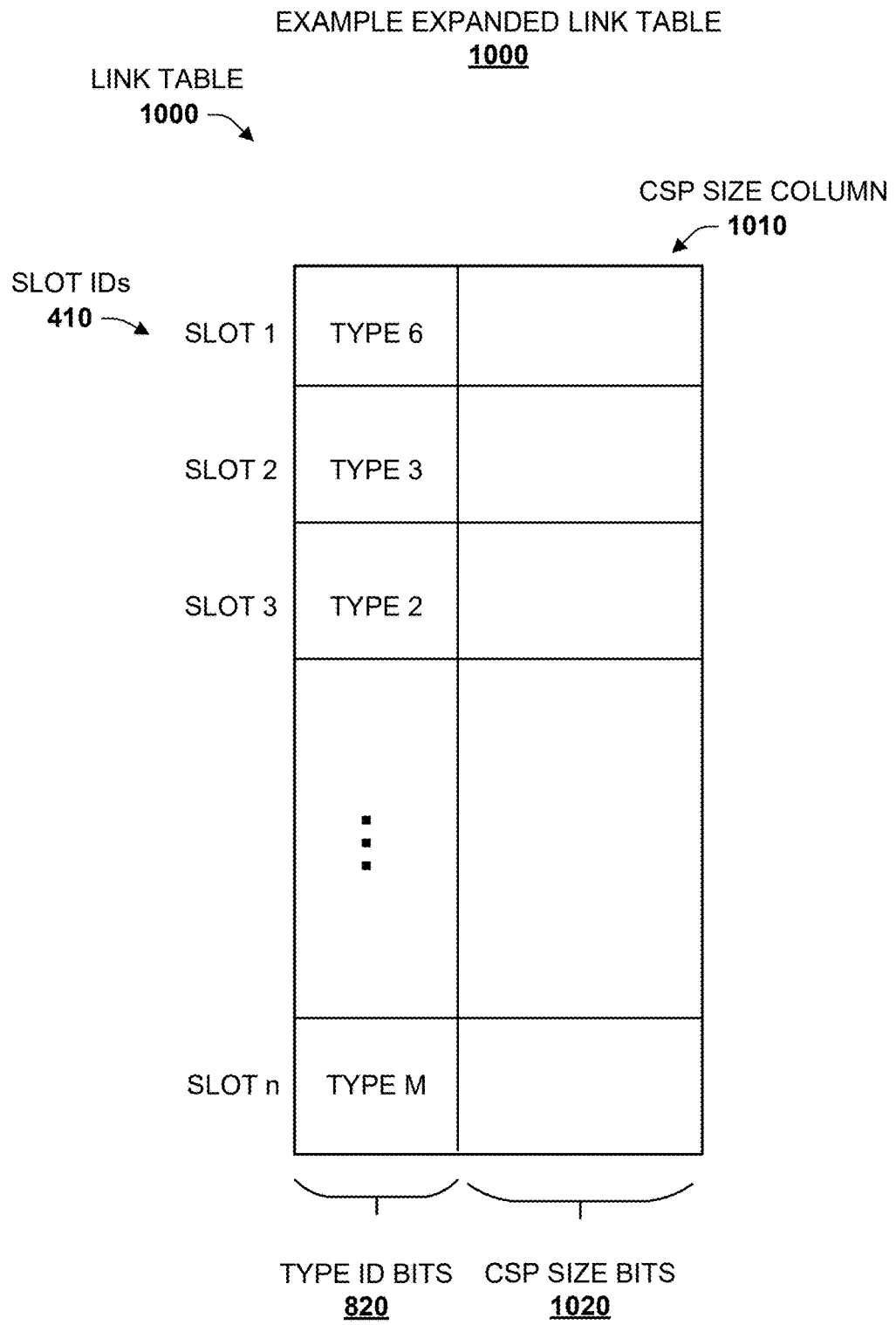
FIG. 10 depicts a sample configuration and access link table defining data size for stored data parameters in still other embodiments.

FIG. 10 depicts a block diagram of an example expanded link table 1000 according to still further embodiments of the present disclosure. Expanded link table 1000 can be utilized to efficiently facilitate internal memory mapping of stored data parameters by an access control device of a secure element, according to further embodiments. This is in contrast to external mapping that allows a device external to secure element 330 to map memory locations of ReRAM 340, for example.

External data mapping can potentially reduce an amount of embedded memory otherwise required in a memory control device, potentially reducing device size and improving density of the memory control device. To this end a host device or other device external to a secure element can map discrete data strings to their respective locations within a physical memory array (e.g., see FIG. 12, infra). Knowledge of such data locations would be provided by the secure element, but then the secure element could forget the data locations and use associated memory for other purposes. This might be pragmatic from an architectural standpoint as an external host device may have larger volume and thus a larger space to house memory to store that data map. In such case, the host device can issue a memory access request that includes specific address locations for data targeted by the memory access request, utilizing its data map. However, this arrangement can reduce effectiveness of the secure element in protecting security parameters stored therein because of the knowledge of the physical memory structure that is exported outside the secure element. For instance, if a hacker gains access to the physical location of a stored security parameter, this can enhance side-channel security attacks attempting to illicitly image, view or otherwise decipher or corrupt the security parameter. Described differently, maintaining data locations private to the secure element can mitigate or avoid side-channel security attacks, and exporting such locations to another device can undermine this benefit.

Expanded link table 1000 can provide internal data mapping at an access control of a secure element with minimal memory overhead, in various aspects of the disclosed embodiments. Expanded link table 1000 adds a data parameter size column 1010 to link table 810. In addition to a predefined configuration definition (embodied by type ID bits 820) correlated with each data parameter by way of slot identifier 410, a size of each data parameter is provided by respective data parameter size bits 1020. The size can be according to any suitable data sizing convention, such as number of bits of data, number of bytes of data, number of words of data, number of pages of data, number of blocks of data, or the like, or a suitable combination of the foregoing.

Where a secure element populates stored data parameters from ReRAM 340 into expanded link table 1000 in a regular manner, a correlation between slot type and data parameter size can be utilized to map locations of stored data parameters within the physical ReRAM 340. The regular manner can be any pattern that correlates each stored data parameter to a known slot identifier 410. For instance, a simple regular manner can be to correlate a data parameter beginning at row 0 (and optionally column 0) of an array to slot 1 of slot identifier 410, and subsequent data parameters at numerically increasing rows (or columns) to subsequent slot numbers. According to this convention, the starting location in the array (e.g., row zero and column zero, or other suitable convention) defines a first bit of a first data parameter and an associated data size of a first data parameter defines both a last bit of the first data parameter, and the first bit (and starting location) of a second data parameter. Similarly, the data size of this second parameter determines a starting location of a third data parameter, and so forth. This enables an access control device to construct or reconstruct a data map of stored data parameters merely with the data parameter size bits 1020 appended to expanded link table 1000. This can reduce memory requirements of an access control device by avoiding memory required to fully correlate each stored data parameter with its physical address locations within ReRAM 340.

Figure 11:
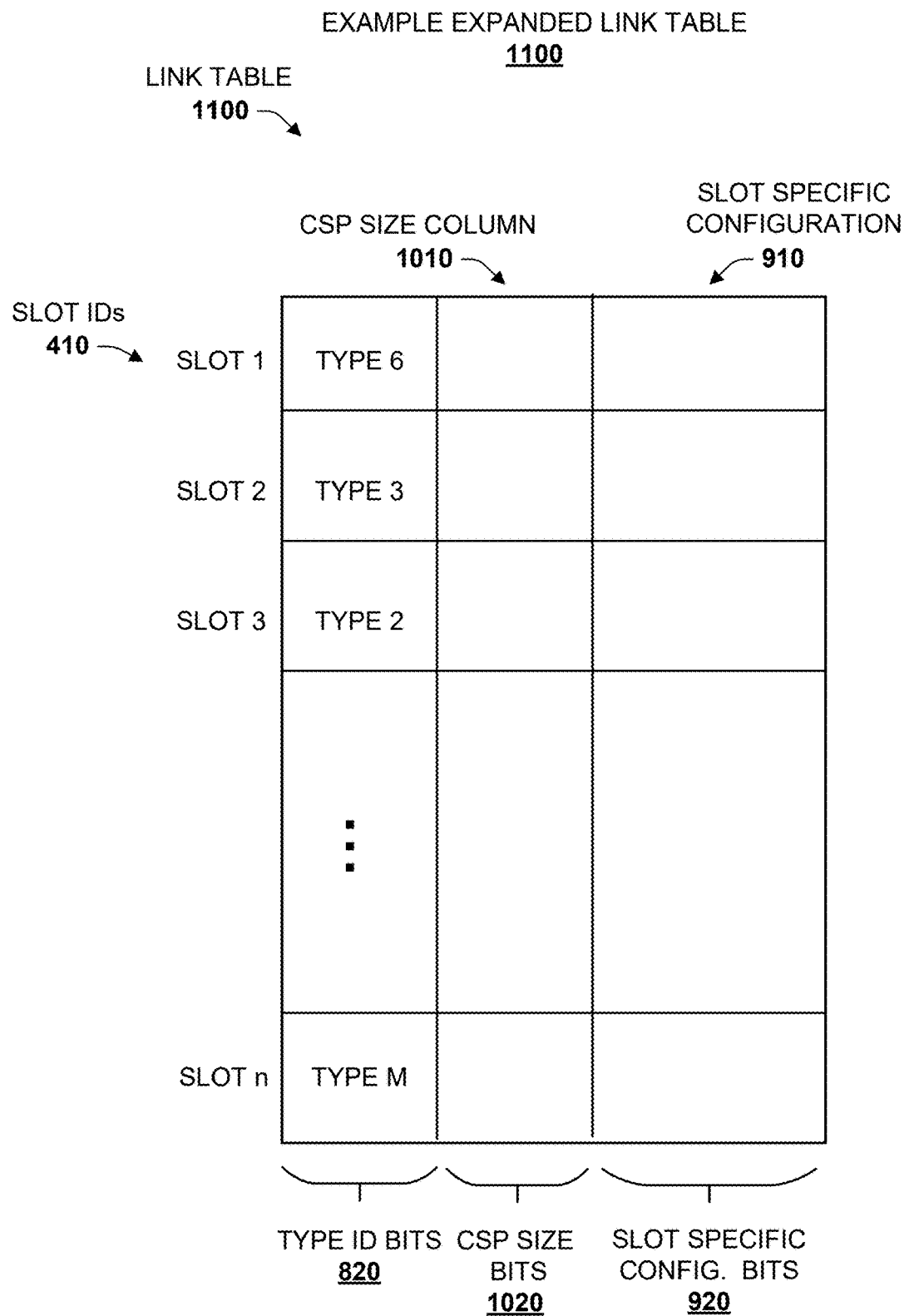
FIG. 11 illustrates a sample configuration and access link table defining data size and slot-specific configuration according to still further embodiments of the disclosure.

FIG. 11 depicts a block diagram of an example expanded link table 1100 according to still further aspects of the disclosed embodiments. Link table 1100 includes slot identifiers 410 correlated with stored data parameters in each slot identifier, as shown in configuration definitions table 805 of FIG. 8, supra. Further, link table 1100 provides type ID bits 820 providing a predefined configuration definition for at least a subset of slot identifiers 410, as well as data parameter size bits 1020 identifying a data size of each data parameter at a given slot identifier 410, as described above at FIG. 10. Moreover, expanded link table 1100 includes slot specific configuration bits 920 from FIG. 9 to provide a data parameter definition(s) in addition to (or optionally in lieu of) those definitions provided in the predefined configuration definitions. Thus, expanded link table 1100 provides an efficient, yet comprehensive and flexible database for both characterizing stored data parameters and for mapping out memory locations of the stored data parameters in the context of a secure element as described herein.

Figure 12:
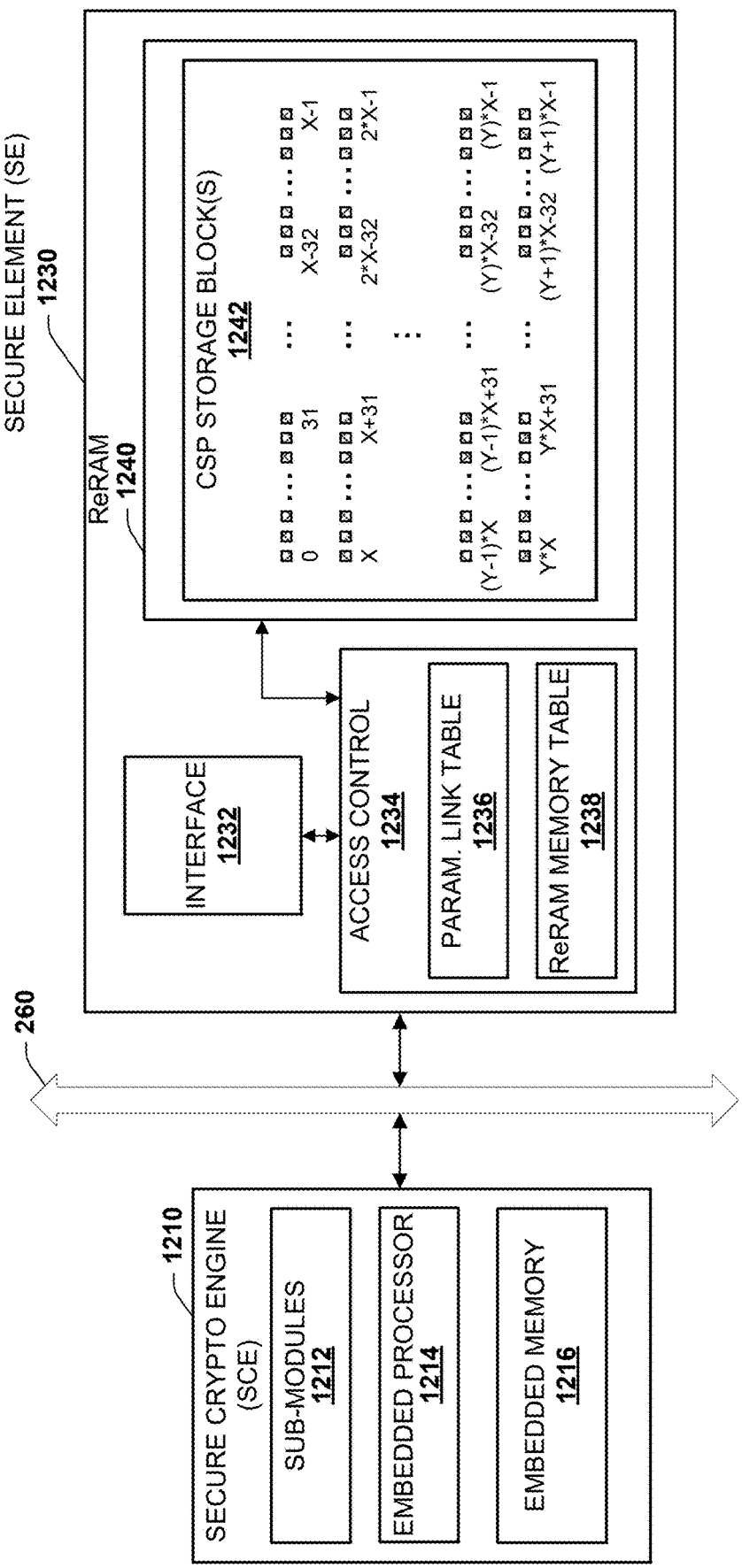
FIG. 12 depicts a block diagram of an example secure element with intrinsic data mapping to enhance security of the secure element, in additional embodiments.

FIG. 12 depicts a block diagram of an example secure data storage network 1200 according to further disclosed embodiments. Secure data storage network 1200 includes a secure element 1230 communicatively coupled to a secure crypto engine 1210 by way of a communication bus 260. It should be appreciated that secure element 1230 can operate with other devices by way of communication bus 260, such as processor 220, or one or more networked devices or computers (e.g., see FIG. 15, infra) in further embodiments of the disclosure.

Secure crypto engine 1210 can comprise an embedded processor 1214 and an embedded memory 1216 to facilitate functions thereof. A relevant example includes a memory access to a cryptographic key stored in secure element 1230. Such a memory access can be employed to validate a process operating on secure crypto engine 1210, encrypt data utilizing the cryptographic key, decrypt data encrypted with the cryptographic key, validate an authorized user of a process, validate an authorized electronic device, and so forth.

As depicted, secure element 1230 includes a communication interface 1232 for receiving electronic communications on communication bus 260, as well as for responding to such communications. Received electronic communications can include memory operations, data access requests, and the like, as well as data to be written to memory, data locations for memory operations, or other data (indirectly) indicative of data to be read, written, overwritten, erased, and so forth.

In some embodiments, received electronic communications can include a module identifier of secure crypto engine 1210, sufficient to distinguish secure crypto engine 1210 from other devices communicatively coupled to communication bus 260. In at least some aspects of these embodiments, received electronic communications can further include a sub-module identifier of one of a set of sub-modules 1212 operating on secure crypto engine 1210. The sub-module identifier can distinguish the one sub-module 1212 from others thereof, enabling memory operations and acknowledgments associated with that sub-module 1212 on communication bus 260 to be distinguished from communications of other sub-modules.

In addition to distinguishing traffic on communication bus 260, the sub-module identifier can be correlated by access control 1234 with a targeted data parameter to ensure compatibility between the sub-module 1212 and the targeted data parameter, or determine whether the sub-module 1212 has approval to access the targeted data parameter, or the like. For instance, where ReRAM 1240 stores cryptographic keys generated from multiple different cryptographic protocols, the sub-module identifier can be utilized to match a crypto sub-module operating with a particular cryptographic protocol (e.g., ECC, AES, HMAC, etc.) to a cryptographic key generated with the same cryptographic protocol. Thus, as a specific example, where ReRAM 1240 stores AES cryptographic keys, ECC cryptographic keys, HMAC cryptographic keys, DES cryptographic keys, and so forth, and access control 1234 characterizes the respective keys utilizing configuration data as described herein, the sub-module identifier included in an access request for a particular key can be compared with configuration data for that key (e.g., a crypto type 513 of configuration definitions 510 of FIG. 5, supra). If the sub-module identifier matches the configuration data, access control 1234 can correctly infer that the application requesting the cryptographic key utilizes the same cryptographic protocol that generated the cryptographic key. This determination can be utilized in whole or in part (e.g., in conjunction with one or more other conditions) to validate the access request.

Access control 1234 can include a parameter link table 1236 that correlates predefined configuration definitions to respective data parameters stored in ReRAM 1240. This allows secure element 1230 to store a single instance of a configuration definition (e.g., a predefined configuration definition 700 of FIG. 7, supra), and utilize a label or identifier associated with that configuration definition to characterize multiple stored data parameters according to that configuration definition. In a similar manner, secure element 1230 can store single instances of multiple predefined configuration definitions each having its own label or identifier. Parameter link table 1236 can correlate a label or identifier of one of these predefined configuration definitions to each of a plurality of data parameters stored at ReRAM 1240. In an embodiment, parameter link table 1236 can further provide a slot specific configuration definition(s) to one or more of the stored data parameters. In yet another embodiment, parameter link table 1236 can provide a data size for one or more of the stored data parameters. For instance, parameter link table can include configuration definitions 805 as well as link table 810, expanded link table 900, expanded link table 1000 or expanded link table 1100, in various alternative embodiments of the present disclosure.

Parameter link table 1236 is shown within access control 1234 and can be stored in embedded memory within access control 1234, in some embodiments. However, in other embodiments, parameter link table 1236 can be stored within ReRAM 1240, or within a separate memory structure of secure element 1230, or a suitable combination of the foregoing (e.g., partly within embedded memory of access control 1234 and partly within ReRAM 1240 or the separate memory structure, and so forth).

Access control 1234 can also maintain a ReRAM memory table 1238 that correlates discrete data parameters with locations of those data parameters in ReRAM 1240. In some embodiments, ReRAM memory table 1238 can provide a physical address for one or more data parameters suitable to uniquely locate such data parameter(s) within security parameter storage blocks 1242 of ReRAM 1240. In at least one embodiment, ReRAM memory table 1238 can provide physical addresses to uniquely locate each data parameter stored in ReRAM 1240.

In other embodiments, ReRAM memory table 1238 can provide a relative location for one or more data parameters, to reduce a memory space required to locate the data parameters stored in ReRAM 1240. In some such embodiments, all data parameters can be mapped with relative location data. In yet another embodiment, a subset of the data parameters can be located with physical addresses and others can be located relative to one (or more) of the data parameters having an explicit physical address.

As an illustrative example, relative location can build upon a default location within an array (e.g., row 0, column 0, row 0 and column 0, or other suitable row/column combination). As another illustrative example, relative location can build upon a physical address of another data parameter. Regardless of starting point, relative data location can be constructed from respective data sizes of sequences of adjacent data parameters in a known relationship. For instance, where the additional data parameters are in consecutive data locations within security parameter storage blocks 1242 compared to the starting point (e.g., the first data parameter), sizes and sequence of subsequent data parameters is sufficient to uniquely locate each data parameters within security parameter storage blocks 1242. For example, where a first data parameter: data parameter$_1$ is known to begin at location 0, and has a length of 512 bits (and thus ending at bit location 511), a data parameter$_2$ immediately following data parameter$_1$ can be located as beginning at bit 512 of security parameter storage blocks 1242 and ending at bit 512+a bit-length of data parameter$_2$. Taking the example where data parameter$_2$ has a bit length of 256 bits, then data parameter$_2$ begins at bit location 512 and ends at bit location 768. Relative locations of subsequent data parameters: data parameter$_3$, ... data parameter$_n$ (where n is a suitable integer larger than 1) can likewise be constructed and saved at ReRAM memory table 1238.

By utilizing a ReRAM memory table 1238 internal to access control 1234, physical locations of data parameters within secure element 1230 need not be exported to external devices. Moreover, by utilizing a link table specifying data size of each data parameter, a location map can be constructed utilizing lower memory space as compared to storing physical addresses of each data location at access control 1234.

FIG. 13 illustrates an example CSP memory address table 1300 utilizing relative memory location information according to various disclosed embodiments. A CSP and size table 1305 is provided that correlates distinct security parameters in a first column via parameter bits 420 with respective slot identifiers 410 in rows of CSP and size table 1305. Further, CSP and size table 1305 indicates a size of each data parameter with respective CSP size bits 1020. In at least one embodiment of the present disclosure, CSP and size table 1305 can be exclusive to critical security parameters, and utilized within access control 1234 to map (relative) locations of the critical security parameters within ReRAM 1240. In this embodiment, CSP and size table 1305 can be maintained internal to secure element 1230. Other data such as code data or rewritable application data can be maintained separately and exported to a host device (e.g., processor 220 of FIG. 2, supra) for external location address mapping (optionally with a virtual address to physical address mapping also maintained at access control 1234). In this embodiment, location of security parameters can be exclusive to access control 1234 whereas non-security data can be location-mapped externally.

FIG. 13 and CSP memory address table 1300 also includes an example ReRAM memory table 1338. As shown, ReRAM memory table 1338 provides parameter addresses 1310 in rows of ReRAM memory table 1338 and respective start addresses 1312 and lengths 1314 of critical security parameters. Starting at address location 0, the length (in bits, bytes, etc.) of a prior parameter defines a start of the subsequent parameter. Respective start addresses 1312 and lengths 1314 can therefore define respective address locations 1320 within ReRAM 1240 for each critical security parameter.

The diagrams included herein are described with respect to several components of an integrated circuit device or network of such devices including memory controllers, secure elements, resistive switching memory arrays, and so forth. It should be appreciated that such diagrams can include those controllers, arrays and devices specified therein, some of the specified components/arrays/devices, or additional components/arrays/devices not explicitly depicted but known in the art or reasonably conveyed to those of skill in the art by way of the context provided herein. Further, embodiments within a particular Figure of the present specification can be applied in part or in whole to other embodiments depicted in other Figures, where suitable, and vice versa. As an illustrative example, column control 1506, row control 1504, reference and control signal generator(s) 1518, clock source(s) 1510 and other components illustrated in FIG. 15 can in turn be included within FIG. 3 and coupled to access control 334 and ReRAM 340 to facilitate memory operations on ReRAM 340, or included within FIG. 12 in analogous fashion as would be understood by one of ordinary skill in the art. Additionally, it is noted that one or more disclosed processes can be combined into a single process providing aggregate functionality. For instance, a deposition process can comprise an etching process, or vice versa, to facilitate depositing and etching a component of an integrated circuit device by way of a single process. Components of the disclosed architectures can also interact with one or more other components not specifically described herein but known by those of skill in the art.

In view of the exemplary diagrams described supra, process methods that can be implemented in accordance with the disclosed subject matter will be better appreciated with reference to the flow chart of FIG. 14. While for purposes of simplicity of explanation, the method of FIG. 14 is shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the method(s) described herein, and in some embodiments additional steps known in the art or reasonably conveyed to one of ordinary skill in the art by way of the context provided herein are also considered within the scope of the present disclosure. Moreover, some steps illustrated as part of one process can be implemented for another process where suitable; other steps of one or more processes can be added or substituted in other processes disclosed herein within the scope of the present disclosure. Additionally, it should be further appreciated that the methods disclosed throughout this specification are capable of being stored on an article of manufacture to facilitate transporting and transferring such methodologies to an electronic device. The term article of manufacture, as used, is intended to encompass a computer program accessible from any computer-readable device, device in conjunction with a carrier, or storage medium.

Referring now to FIG. 14, there is shown a method 1400 for addressing memory locations of security parameters stored within a secure element device according to alternative or additional embodiments of the present disclosure. At 1402, method 1400 can comprise implementing a power-up at a secure element device. The power-up can be a power cycle as generally understood in the art for an electronic device, can be an initial power startup, or can be a startup process in response to restoring power previously isolated from electronically-powered components of the secure element device. At 1404, method 1400 can comprise accessing a data parameter table correlating data parameters stored at the secure element device with respective data sizes of the stored data parameters. The data sizes can be reflected in bits, bytes, words, pages, blocks, or the like, or another suitable definition of data size understood in the art or reasonably conveyed to one of ordinary skill in the art by way of the context provided herein.

At 1406, method 1400 can comprise identifying a first data parameter of the data parameter table and assign the first data parameter to begin at a zero address location of an array of non-volatile memory. The array of two-terminal non-volatile memory can a resistive switching non-volatile memory array, in some disclosed embodiments. Moreover, the zero address location can be a first row of a block, a first block of the array, or other suitable orientation.

At 1408, method 1400 can comprise determining a size of the first data parameter from the data parameter table and identifying an end location in the array for the first data parameter. The end location can be determined from the zero address location and proceeding within the array a number of data locations (e.g., bits, memory cells, bytes, words, etc.) equal to the size of the first data parameter as described herein (e.g., see FIGS. 12 and 13, supra). At 1410, method 1400 can comprise identifying a second data parameter and assign the second data parameter to begin at a bit following the end location. At 1412, method 1400 can comprise determining a size of the second data parameter from the data parameter table and identifying a second end location within the array for the second data parameter.

At 1414, method 1400 can comprise continuing mapping of start and end locations in the array for each stored data parameter and completing a relative memory mapping table of data parameters stored in a resistive memory array structure of the secure element device. At 1416, method 1400 can comprise receiving a memory access request to a data parameter of the data parameter table and, at 1418, method 1400 can comprise authenticating the memory access request. At 1420, method 1400 can comprise referencing the relative memory mapping table and obtain a location of the data parameter from the memory mapping table. Further, at 1422, method 1400 can comprise reading the data parameter from the obtained location and provide the data parameter in response to the memory access request.

Method 1400 can facilitate a memory access request at a secure element device from a memory location map maintained partly or wholly within the secure element device. Method 1400 can therefore maintain heightened security of stored data parameters in responding to the memory access request for the secure element device. In addition, utilizing a relative location mapping provided by method 1400 can reduce an amount of memory within the secure element device required to store the relative memory mapping table of stored data parameters according to various embodiments of the present disclosure.

Example Operating Environments

Figure 15:
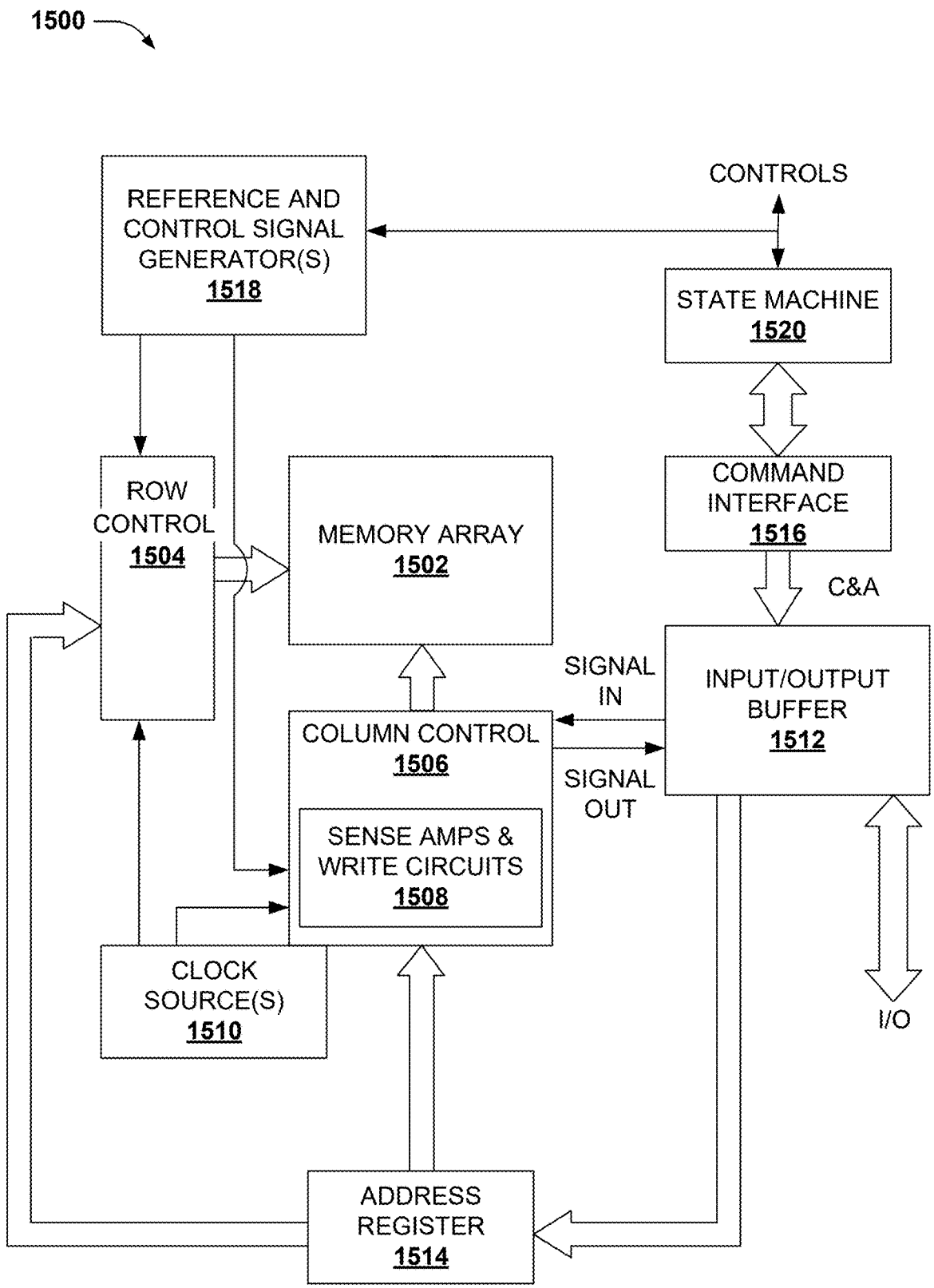
FIG. 15 illustrates a block diagram of a sample electronic operating environment in accordance with certain embodiments presented herein.

FIG. 15 illustrates a block diagram of an example operating and control environment 1500 for a memory array 1502 of a memory cell array according to aspects of the subject disclosure. Control environment 1500 and memory array 1502 can be formed within a single semiconductor die in some embodiments, although the subject disclosure is not so limited and in other embodiments some components of control environment 1500 can be formed on a separate semiconductor die. In at least one aspect of the subject disclosure, memory array 1502 can comprise memory selected from a variety of memory cell technologies. In at least one embodiment, memory array 1502 can comprise a two-terminal memory technology, arranged in a compact two or three-dimensional architecture. Suitable two-terminal memory technologies can include resistive-switching memory, conductive-bridging memory, phase-change memory, organic memory, magneto-resistive memory, or the like, or a suitable combination of the foregoing. In a further embodiment, the two-terminal memory technology can be a two-terminal resistive switching technology.

A column controller 1506 and sense amps 1508 can be formed adjacent to memory array 1502. Moreover, column controller 1506 can be configured to activate (or identify for activation) a subset of bit lines of memory array 1502. Column controller 1506 can utilize a control signal provided by a reference and control signal generator(s) 1518 to activate, as well as operate upon, respective ones of the subset of bitlines, applying suitable program, erase or read voltages to those bitlines. Non-activated bitlines can be kept at an inhibit voltage (also applied by reference and control signal generator(s) 1518), to mitigate or avoid bit-disturb effects on these non-activated bitlines.

In addition, operating and control environment 1500 can comprise a row controller 1504. Row controller 1504 can be formed adjacent to and electrically connected with word lines of memory array 1502. Also utilizing control signals of reference and control signal generator(s) 1518, row controller 1504 can select particular rows of memory cells with a suitable selection voltage. Moreover, row controller 1504 can facilitate program, erase or read operations by applying suitable voltages at selected word lines.

Sense amps 1508 can read data from, or write data to, the activated memory cells of memory array 1502, which are selected by column control 1506 and row control 1504. Data read out from memory array 1502 can be provided to an input/output buffer 1512. Likewise, data to be written to memory array 1502 can be received from the input/output buffer 1512 and written to the activated memory cells of memory array 1502.

A clock source(s) 1510 can provide respective clock pulses to facilitate timing for read, write, and program operations of row controller 1504 and column controller 1506. Clock source(s) 1510 can further facilitate selection of word lines or bit lines in response to external or internal commands received by operating and control environment 1500. Input/output buffer 1512 can comprise a command and address input, as well as a bidirectional data input and output. Instructions are provided over the command and address input, and the data to be written to memory array 1502 as well as data read from memory array 1502 is conveyed on the bidirectional data input and output, facilitating connection to an external host apparatus, such as a computer or other processing device (not depicted, but see e.g., computer 1602 of FIG. 16, infra).

Input/output buffer 1512 can be configured to receive write data, receive an erase instruction, receive a status or maintenance instruction, output readout data, output status information, and receive address data and command data, as well as address data for respective instructions. Address data can be transferred to row controller 1504 and column controller 1506 by an address register 1514. In addition, input data is transmitted to memory array 1502 via signal input lines between sense amps 1508 and input/output buffer 1512, and output data is received from memory array 1502 via signal output lines from sense amps 1508 to input/output buffer 1512. Input data can be received from the host apparatus, and output data can be delivered to the host apparatus via the I/O bus.

Commands received from the host apparatus can be provided to a command interface 1516. Command interface 1516 can be configured to receive external control signals from the host apparatus, and determine whether data input to the input/output buffer 1512 is write data, a command, or an address. Input commands can be transferred to a state machine 1520.

State machine 1520 can be configured to manage programming and reprogramming of memory array 1502 (as well as other memory banks of a multi-bank memory array). Instructions provided to state machine 1520 are implemented according to control logic configurations, enabling state machine 1520 to manage read, write, erase, data input, data output, and other functionality associated with memory cell array 1502. In some aspects, state machine 1520 can send and receive acknowledgments and negative acknowledgments regarding successful receipt or execution of various commands. In further embodiments, state machine 1520 can decode and implement status-related commands, decode and implement configuration commands, and so on.

To implement read, write, erase, input, output, etc., functionality, state machine 1520 can control clock source(s) 1510 or reference and control signal generator(s) 1518. Control of clock source(s) 1510 can cause output pulses configured to facilitate row controller 1504 and column controller 1506 implementing the particular functionality. Output pulses can be transferred to selected bit lines by column controller 1506, for instance, or word lines by row controller 1504, for instance.

Figure 16:
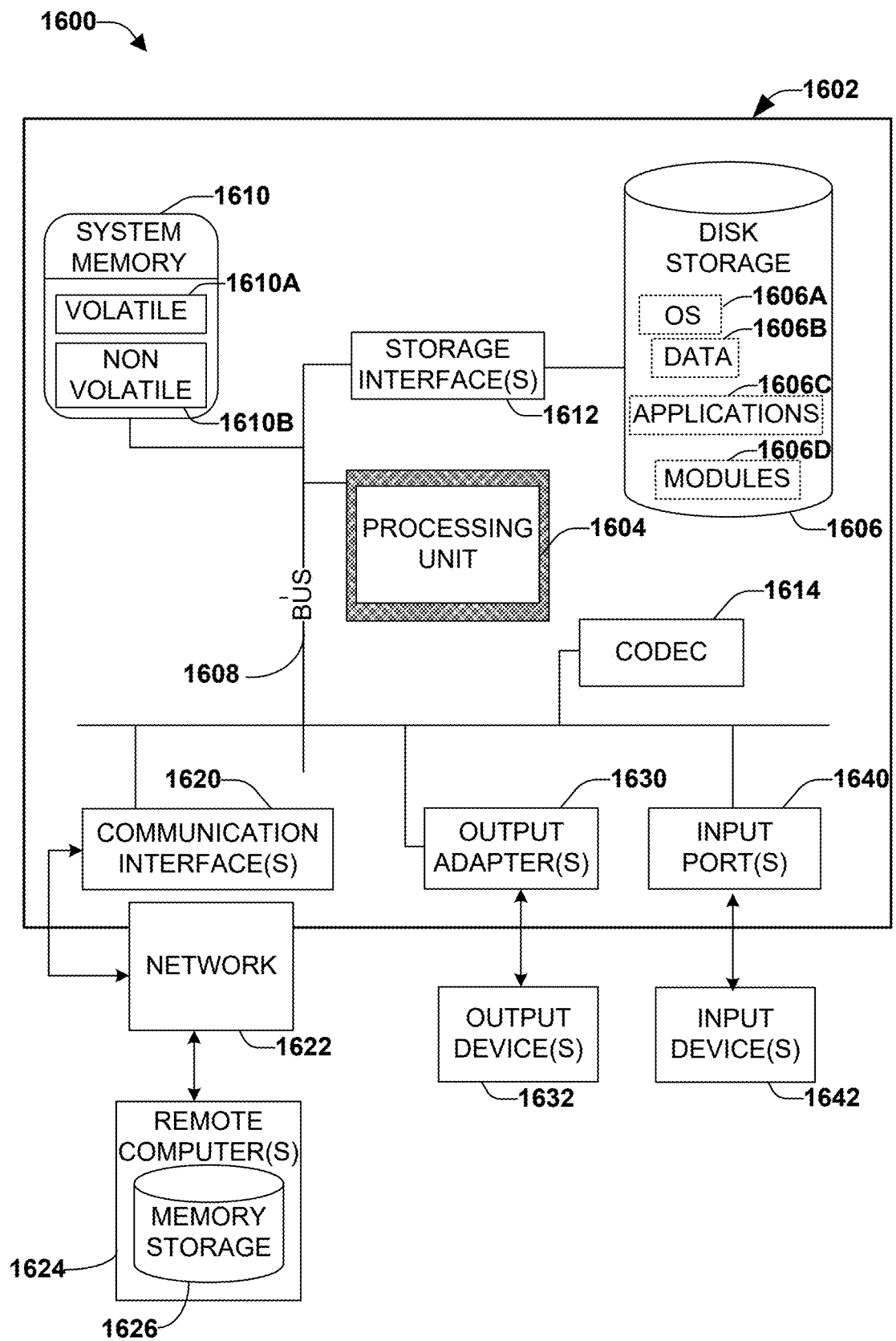
FIG. 16 depicts a block diagram of an example computing environment for implementing one or more disclosed embodiments of the present disclosure.

In connection with FIG. 16, the systems, devices, and/or processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

With reference to FIG. 16, a suitable environment 1600 for implementing various aspects of the claimed subject matter includes a computer 1602. The computer 1602 includes a processing unit 1604, a system memory 1610, a codec 1614, and a system bus 1608. The system bus 1608 couples system components including, but not limited to, the system memory 1610 to the processing unit 1604. The processing unit 1604 can be any of various available processors. Dual microprocessors, quad microprocessors and other multiprocessor architectures also can be employed as the processing unit 1604.

The system bus 1608 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394, Small Computer Systems Interface (SCSI), Compute eXpress Link (CXL), high speed Serial Peripheral Interface (SPI) interfaces (e.g., HyperFlash, and so forth), Inter-Integrated Circuit ($I^2C$) communication protocol, $I^3C$ protocol, etc.

The system memory 1610 includes volatile memory 1610A and non-volatile memory 1610B. The basic input/output system (BIOS), containing the basic routines to transfer information between elements within the computer 1602, such as during start-up, is stored in non-volatile memory 1610B. In addition, according to present innovations, codec 1614 may include at least one of an encoder or decoder, wherein the at least one of the encoder or decoder may consist of hardware, software, or a combination of hardware and software. Although codec 1614 is depicted as a separate component, codec 1614 may be contained within non-volatile memory 1610B. By way of illustration, and not limitation, non-volatile memory 1610B can include read only memory (ROM), programmable ROM (PROM), electrically programmable ROM (EPROM), electrically erasable programmable ROM (EEPROM), or flash memory, two-terminal memory, filamentary resistive-switching non-volatile memory, and so on. Volatile memory 1610A includes random access memory (RAM), and in some embodiments can embody a cache memory. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ES-DRAM), but also can be embodied by a volatile two-terminal resistive-switching technology, such as a volatile resistive switching selector.

Computer 1602 may also include removable/non-removable, volatile/non-volatile computer storage medium. FIG. 16 illustrates, for example, disk storage 1606. Disk storage 1606 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1606 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1606 to the system bus 1608, a removable or non-removable interface is typically used, such as storage interface 1612. It is appreciated that storage devices 1606 can store information related to a user. Such information might be stored at or provided to a server or to an application running on a user device. In one embodiment, the user can be notified (e.g., by way of output device(s) 1632) of the types of information that are stored to disk storage 1606 or transmitted to the server or application. The user can be provided the opportunity to opt-in or opt-out of having such information collected and/or shared with the server or application (e.g., by way of input from input device(s) 1642).

It is to be appreciated that FIG. 16 describes software that acts as an intermediary between users and the basic computer resources described in the suitable operating environment 1600. Such software includes an operating system 1606A. Operating system 1606A, which can be stored on disk storage 1606, acts to control and allocate resources of the computer system 1602. Applications 1606C take advantage of the management of resources by operating system 1606A through program modules 1606D, and program data 1606D, such as the boot/shutdown transaction table and the like, stored either in system memory 1610 or on disk storage 1606. It is to be appreciated that the claimed subject matter can be implemented with various operating systems or combinations of operating systems.

A user enters commands or information into the computer 1602 through input device(s) 1642. Input devices 1642 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1604 through the system bus 1608 via input port(s) 1640. Input port(s) 1640 include, for example, a serial port, a parallel port, a game port, and a universal serial bus (USB). Output device(s) 1632 use some of the same type of ports as input device(s) 1642. Thus, for example, a USB port may be used to provide input to computer 1602 and to output information from computer 1602 to an output device 1632. Output adapter 1630 is provided to illustrate that there are some output devices 1632 like monitors, speakers, and printers, among other output devices 1632, which require special adapters. The output adapters 1630 include, by way of illustration and not limitation, video and sound cards that provide a means of connection between the output device 1632 and the system bus 1608. It should be noted that other devices or systems of devices provide both input and output capabilities such as remote computer(s) 1638.

Computer 1602 can operate in a networked environment using logical connections to one or more remote computers, such as remote computer(s) 1624. The remote computer(s) 1624 can be a personal computer, a server, a router, a network PC, a workstation, a microprocessor based appliance, a peer device, a smart phone, a tablet, or other network node, and typically includes many of the elements described relative to computer 1602. For purposes of brevity, only a memory storage device 1626 is illustrated with remote computer(s) 1624. Remote computer(s) 1624 is logically connected to computer 1602 through a network 1622 and then connected via communication interface(s) 1620. Network 1622 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication interface(s) 1620 refers to the hardware/software employed to connect the network 1622 to the bus 1608. While communication interface(s) 1620 is shown for illustrative clarity inside computer 1602, it can also be external to computer 1602. The hardware/software necessary for connection to the network 1622 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

Moreover, it is to be appreciated that various components described herein can include electrical circuit(s) that can include components and circuitry elements of suitable value in order to implement the embodiments of the subject disclosure. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further embodiments can be envisioned to one of ordinary skill in the art after reading this disclosure. For example, in various embodiments, erase operations may be initiated upon a plurality of ReRAM devices (e.g., 16, 32, etc.) at the same time.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A secure element data storage device, comprising:
   an array of two-terminal non-volatile memory that stores a plurality of security parameters;
   an access control communicatively coupled to the array of two-terminal non-volatile memory wherein the access control comprises:
   array control circuitry for management of memory operations at the array including a read memory operation for reading a security parameter of the plurality of security parameters stored at the plurality of two-terminal memory cells;
   a configuration dataset that defines respective data sizes for each of the plurality of security parameters stored at the array of two-terminal non-volatile memory and an ordering of the plurality of security parameters within the array;
   a memory address mapping that defines a location of the security parameter within the array utilizing the ordering of the plurality of security parameters and the respective data sizes for each of the plurality of security parameters; and
   a communication interface configured to receive a data communication that defines the read memory operation to the security parameter and provides the data communication to the access control.

2. The secure element data storage device of claim 1, wherein the ordering of the plurality of security parameters is a relative ordering of respective security parameters with respect to a fixed position of a second security parameter of the plurality of security parameters.

3. The secure element data storage device of claim 1, wherein the plurality of security parameters comprises at least two security parameters selected from the group consisting essentially of: an elliptic curve cryptography cryptographic key of a first data length, a data encryption standard cryptographic key of a second data length, an advanced encryption standard cryptographic key of a third data length, a hash-based message authentication code cryptographic key of a fourth data length and a true random number generation number of a fifth data length.

4. The secure element data storage device of claim 1, wherein:
   the configuration dataset further defines a first characteristic definition for the security parameter; and
   the access control extracts a module identifier from the data communication and compares the module identifier to the first characteristic definition and validates the read memory operation at least in part in response to the module identifier matching the first characteristic definition, and invalidates the read memory operation in response to the module identifier failing to match the first characteristic definition.

5. The secure element data storage device of claim 4, wherein the first characteristic definition is a module permission flag authorizing the module identifier for the read memory operation.

6. The secure element data storage device of claim 4, wherein:
   the configuration dataset further defines a second characteristic definition for the security parameter; and
   the access control extracts a sub-module identifier from the data communication in conjunction with the module identifier and further compares the sub-module identifier to the second characteristic definition and validates the read memory operation at least in part in response to both the module identifier matching the first characteristic definition and the sub-module identifier matching the second characteristic definition.

7. The secure element data storage device of claim 1, wherein the array of two-terminal non-volatile memory further stores a data parameter pertaining to code instructions or pertaining to rewritable data of an application.

8. The secure element data storage device of claim 7, wherein the configuration dataset defines an access characteristic for the data parameter exclusive to a processor of an electronic device external to the secure element data storage device, and wherein authentication of a memory operation targeting the data parameter requires a module identifier of the processor.

9. A method for managing storage memory at a secure element device, comprising:
   access a data parameter table in non-volatile memory that correlates a plurality of data parameters with respective data sizes of the plurality of data parameters;
   identify a first data parameter of the plurality of data parameters and correlate the first data parameter to a fixed location within an array of two-terminal non-volatile memory of the secure element device;
   determine a size of the first data parameter from the respective data sizes in the data parameter table;
   determine an end location of the first data parameter within the array from the fixed location and the size;
   identify a second data parameter of the plurality of data parameters and correlate the second data parameter to a location within the array relative to the end location of the first data parameter;
   determine a second size of the second data parameter from the respective data sizes in the data parameter table; and
   determine a second end location of the second data parameter within the array from the location within the array and the second size of the second data parameter.

10. The method of claim 9, further comprising determining relative locations of each data parameter of the plurality of data parameters within the array and compiling a relative memory mapping table of data parameters of the plurality of data parameters and respective locations in the array of each of the data parameters.

11. The method of claim 9, wherein the first size of the first data parameter is different from the second size of the second data parameter.

12. The method of claim 9, wherein correlating the first data parameter to a fixed location within the array further comprises correlating a first bit of the first data parameter to a zero$^{th}$ bit of a zero$^{th}$ row of the array and wherein determining the end location of the first data parameter within the array further comprises correlating a last bit of the first data parameter with an x-1$^{th}$ bit of the array, wherein x is a number in bits of the size of the first data parameter.

13. The method of claim 12, wherein correlating the second data parameter to the location within the array relative to the end location of the first data parameter further comprises correlating a first bit of the second data parameter to an x$^{th}$ bit of the array.

14. The method of claim 9, further comprising:
   receiving a memory access request from an electronic device external to the secure element device; and
   authenticating the memory access request to determine whether the electronic device is authorized to access the secure element device.

15. The method of claim 14, wherein authenticating the memory access request further comprises:
   extracting a module identifier distinctive of the electronic device from the memory access request;
   determining a target data parameter of the plurality of data parameters or a target array location specified for a memory operation within the memory access request;
   reference a configuration dataset associated with the plurality of data parameters and identify data characterization definitions correlated with the target data parameter or with the target array location by the configuration dataset;
   compare the module identifier with the data characterization definitions; and
   determine that the module identifier matches a first data characterization definition of the data characterization definitions.

16. The method of claim 15, wherein authenticating the memory access request further comprises:
   extracting a sub-module identifier from the memory access request distinctive of a cryptographic application operating on the electronic device;
   compare the sub-module identifier with the data characterization definitions; and
   determine that the sub-module identifier matches a second data characterization definition of the data characterization definitions.

17. The method of claim 15, further comprising, in response to authenticating the memory access request, accessing a relative memory mapping table to determine a location of the target data parameter within the array, and read the target data parameter from the location determined from the relative memory mapping table.

18. The method of claim 9, wherein the plurality of data parameters comprises two or more data parameters selected from the group consisting essentially of: an elliptic curve cryptography cryptographic key, a data encryption standard cryptographic key, an advanced encryption standard cryptographic key, a hash-based message authentication code cryptographic key and a true random number generation private code.

19. The method of claim 9, wherein the plurality of data parameters includes a code data parameter comprising code instructions for operating an application executing on a processor external to the secure element device.

20. The method of claim 9, wherein the plurality of data parameters includes a rewritable application data parameter maintained by an application executing on a processor external to the secure element device.

\* \* \* \* \*